United States Patent

Sung

[11] Patent Number: 5,982,072
[45] Date of Patent: Nov. 9, 1999

[54] ELECTRIC MOTOR HAVING A PLURALITY OF BRUSHES AND COMMUTATORS

[76] Inventor: Sam Kyung Sung, 1204-99 Daeyeon-Dong, Builjunwon #301, Nam-Ku, Pusan, Rep. of Korea

[21] Appl. No.: 09/050,970

[22] Filed: Mar. 31, 1998

[30] Foreign Application Priority Data

May 22, 1997 [KR] Rep. of Korea ............ 97-21085
Dec. 5, 1997 [KR] Rep. of Korea ............ 97-66846

[51] Int. Cl.⁶ ........................................... H02K 13/00
[52] U.S. Cl. ................. 310/239; 310/91; 310/148; 310/233; 310/236
[58] Field of Search ........................ 310/231, 233, 310/236, 237, 239, 245, 249, 254, 156, 177, 71, 68 B, 127, 128, 133, 134, 145, 148, 235, 91

[56] References Cited

U.S. PATENT DOCUMENTS

| | | | |
|---|---|---|---|
| 4,704,552 | 11/1987 | Masterman | 310/148 |
| 4,845,396 | 7/1989 | Huber | 310/239 |
| 4,873,463 | 10/1989 | Jones | 310/68 B |
| 5,117,167 | 5/1992 | Kazmirski | 318/439 |
| 5,159,222 | 10/1992 | Southall | 310/239 |
| 5,319,277 | 6/1994 | Materne et al. | 310/239 |
| 5,414,317 | 5/1995 | Reid et al. | 310/239 |
| 5,485,049 | 1/1996 | Shannon et al. | 310/248 |
| 5,610,467 | 3/1997 | Shiah et al. | 310/239 |
| 5,661,354 | 8/1997 | Burtis | 310/113 |

*Primary Examiner*—Nestor Ramirez
*Assistant Examiner*—Tran Nguyen
*Attorney, Agent, or Firm*—Birch, Stewart, Kolasch & Birch, LLP

[57] ABSTRACT

An electric motor in which polarities of a stator and the number of polarities thereof are converted by converting the polarity of current depending on a rotation position of a rotor made of a permanent magnet so as to enhance attraction and repulsion occurring between the rotor and the stator, so that a rotative force of the rotor can be achieved with minimum power. The electric motor includes a stator having a plurality of iron cores fixably mounted within a main body at a predetermined distance and a plurality of coils wound in the plurality of iron cores, a rotor disposed in a center portion of the main body, having a permanent magnet having a predetermined number of polarities between an upper cover formed in an integral form with a connecting portion and a lower cover, a current converter screwed to the connecting portion of the rotor externally protruded over a cover of the main body, for supplying current to coils wound in the iron cores and converting polarity of current, a brush fixing portion for supplying main current to the current converter and fixing a plurality of brushes which supply current to the coils through the current converter, and a current supply portion mounted in the cover of the main body and connected to the plurality of brushes, for supplying current to the coils wound in the iron cores.

18 Claims, 31 Drawing Sheets

(a)

(b)

(c)

(d)

5,982,072

ELECTRIC MOTOR HAVING A PLURALITY OF BRUSHES AND COMMUTATORS

BACKGROUND OF THE INVENTION

1. Field of the Invention

The present invention relates to an electric motor. More particularly, the present invention relates to an electric motor in which polarities of a stator and the number of polarities thereof are converted by converting the polarity of current depending on a rotation position of a rotor made of a permanent magnet so as to enhance the attraction and repulsion occurring between the rotor and the stator, so that a rotative force of the rotor can be achieved with minimum power.

2. Discussion of the Related Art

A motor is a rotary machine which converts electrical energy to mechanical energy. Generally, a direct current (DC) motor driven by a DC power source includes a stator of a permanent magnet, fixably mounted on an outer side of a main body, a rotor rotated by attraction and repulsion with the stator, and a brush for supplying current to a coil in contact with the rotor. The rotor includes an iron core fixably mounted on a rotary shaft to be rotated, a coil wound in the iron core to provide the iron core with an electromagnetic property by means of current applied to the iron core, and a commutator for supplying current to the coil.

A conventional DC motor will be described with reference to FIGS. 1a and 1b.

FIG. 1a is a longitudinal sectional view illustrating a conventional DC motor.

Referring to FIG. 1a, a stator 10 includes a first permanent magnet 2 and a second permanent magnet 3. The first permanent magnet 2 and the second permanent magnet 3 are mounted in an inner wall of a main body 1 to oppose each other at a predetermined distance.

A rotor 20 includes a plurality of commutators 23, iron cores 25, and coils 24. The plurality of commutators 23 separated from each other by a predetermined distance are fixably mounted at one side of a shaft 21 by means of combining members 22. The iron cores 25 are fixably mounted at a predetermined distance from the commutators 23. First to eighth folders 25a~25h are radially formed in an inner side of the iron cores 25. In the first to eighth folders 25a~25h, the coils 24 are wound in one direction through the commutators 23.

A first brush 5 and a second brush 6 are elastically mounted at one side of an inner wall of a cover 4 in contact with the commutators 23. The first and second brushes 5 and 6 supply power to the coil 24 to provide the iron cores 25 with an electromagnetic property.

In the aforementioned conventional DC motor, as illustrated in FIG. 1a, the positive "+" power source is applied to the first brush 5 and the negative "−" power source is applied to the second brush 6. The first and second brushes 5 and 6 are in contact with the commutators 23 to flow current into the coil 24 so that the first to eighth folders 25a~25h of the iron cores 25 become electromagnets each having a particular polarity, respectively.

Therefore, the first to eighth folders 25a~25h of the iron cores 25 and the first and second permanent magnets 2 and 3 mutually generate attraction and repulsion to rotate the rotor 20 which includes the iron cores 25, the coil 24 and the commutators 23.

As illustrated in FIG. 1b, it is assumed that the positive "+" power source is applied to the wound coil 24 of the first folder 25a through the first brush 5 and the commutators 23 and the negative "−" power source is applied to the wound coil 24 of the fifth folder 25e through the second brush 6 and the commutators 23. In that case, the second to fourth folders 25b~25d become electromagnets having N polarity and the sixth to eighth folders 25f~25h become electromagnets having S polarity.

Therefore, repulsion occurs between the first permanent magnet 2 and the third and fourth folders 25c and 25d because of the same N polarity and repulsion occurs between the second permanent magnet 3 and the seventh and eighth folders 25g and 25h because of the same S polarity. At the same time, attraction occurs between the second permanent magnet 3 and the sixth and seventh folders 25f and 25g because of different polarities, and attraction occurs between the first permanent magnet 2 and the second and third folders 25b and 25c because of different polarities. As a result, the rotor 20 rotates clockwise.

The aforementioned conventional DC motor has several problems.

First, the rotor of the conventional DC motor includes the iron cores having the plurality of folders, fixably mounted on the shaft, the coil wound in the folders, and the commutators for supplying the current to the coil. This structure complicates the configuration of the rotor and causes increased load when rotating the rotor, thereby reducing the rotative force of the rotor.

Further, in the conventional DC motor, since half of the folders formed in the iron cores have an N polarity and the other folders have an S polarity, attraction and repulsion occur partially in a longitudinal end portion of the permanent magnet of the stator and in some of the folders of the rotor disposed at the longitudinal end portion. Therefore, a certain rotative force is maintained. However, to generate a high rotative force, it is necessary to supply more current to the coil through the commutators. As a result, power consumption increases.

In this respect, development of an electric motor having a high rotative force at a low power is required.

SUMMARY OF THE INVENTION

Accordingly, the present invention is directed to an electric motor that substantially obviates one or more of the problems due to limitations and disadvantages of the related art.

An object of the present invention is to provide an electric motor in which a rotor is formed of a permanent magnet having two or more polarities. Furthermore, a stator is formed of a plurality of iron cores wound by a plurality of coils regardless of winding direction and converted to an electromagnet when current is applied to the coils so as to generate attraction and repulsion by means of mutual action with the permanent magnet of the rotor.

Another object of the present invention is to provide an electric motor in which the polarity of current applied to the coils is converted to convert the polarities of the iron cores of a stator and the number of the polarities thereof depending on a rotation position of a rotor so as to enhance attraction and repulsion occurring between the rotor and the stator, so that a high rotative force can be achieved with minimum power.

Still another object of the present invention is to provide an electric motor in which a current converter having a plurality of commutators is formed compact in size and extra current for use in producing a rotative force of a rotor is absorbed and stored to be recycled, thereby saving electric energy for use in rotation of the rotor.

Another object of the present invention is to provide an electric motor which includes a current converter having a plurality of commutators separated from one another to supply current to coils wound in iron cores of a stator, for converting the polarity of current applied to the coils through brushes when a rotor rotates, in response to a rotation position of the rotor, so to enhance attraction and repulsion between the rotor and the stator.

Still another object of the present invention is to provide an electric motor which includes a current supply portion having a plurality of power transistors which apply main current to coils to prevent spark occurring when a plurality of brushes are in contact with a plurality of commutators of the current converter commutator, thereby semi-permanently increasing the life span of the motor.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an electric motor of the present invention includes a stator having a plurality of iron cores fixably mounted within a main body at a predetermined distance and a plurality of coils wound in the plurality of iron cores, a rotor disposed in a center portion of the main body, having a permanent magnet having a predetermined number of polarities between an upper cover formed in an integral form with a connecting portion and a lower cover, a current converter screwed to the connecting portion of the rotor externally protruded over a cover of the main body, for supplying current to coils wound in the iron cores and converting the polarity of current, a brush fixing portion for supplying main current to the current converter and fixing a plurality of brushes which supply current to the coils through the current converter, and a current supply portion mounted in the cover of the main body and connected to the plurality of brushes, for supplying current to the coils wound in the iron cores.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1A:
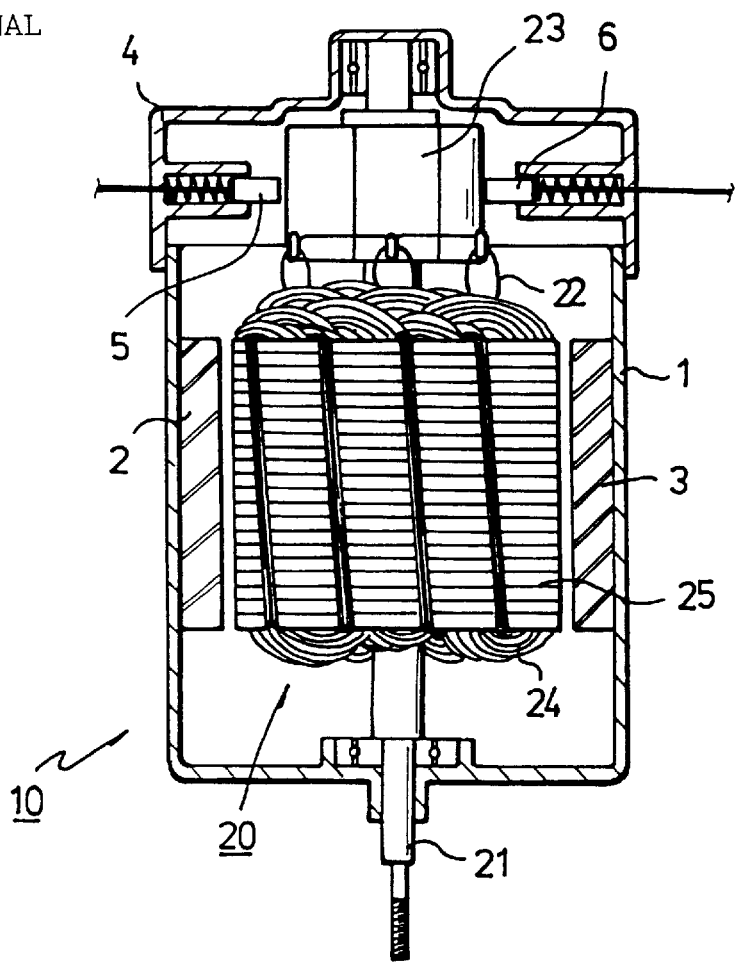
FIG. 1a is a longitudinal-sectional view illustrating a structure of a conventional DC motor.
Figure 1B:
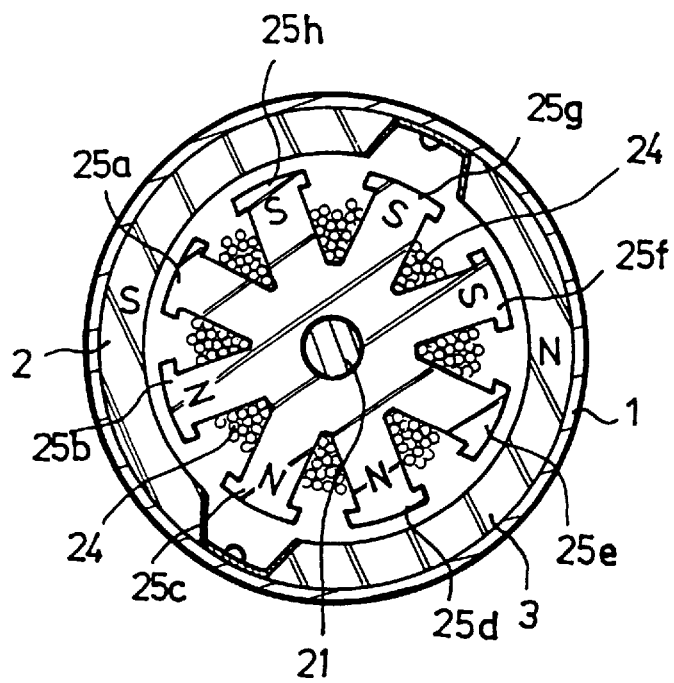
FIG. 1b is a cross-sectional view illustrating a structure of a conventional DC motor.
Figure 2:
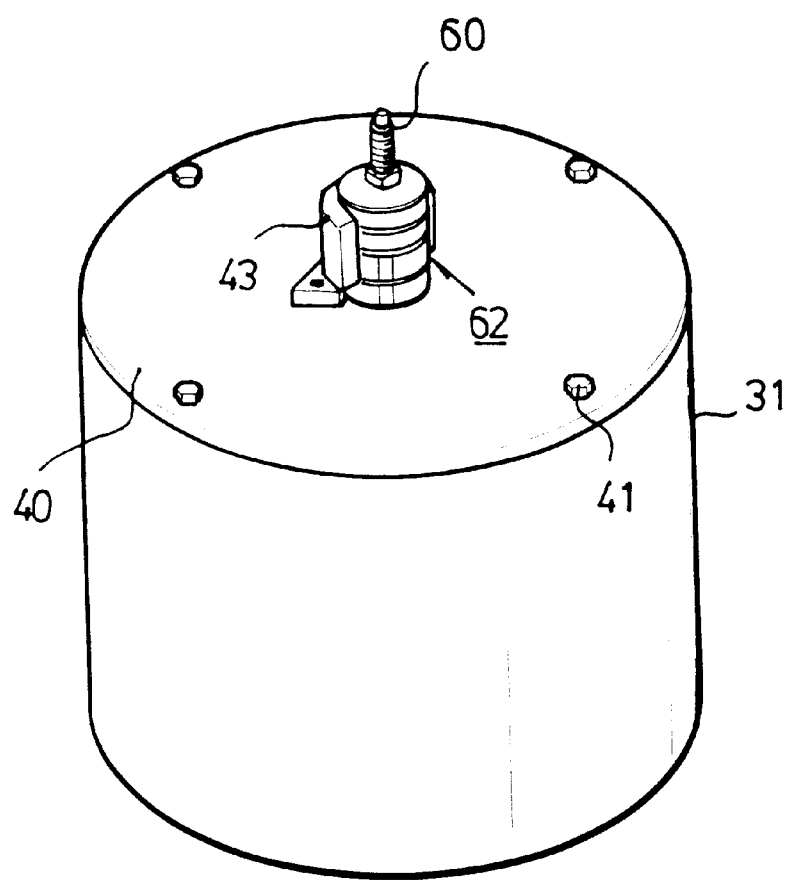
FIG. 2 is a perspective view illustrating the combining state of an electric motor according to the present invention.
Figure 3:
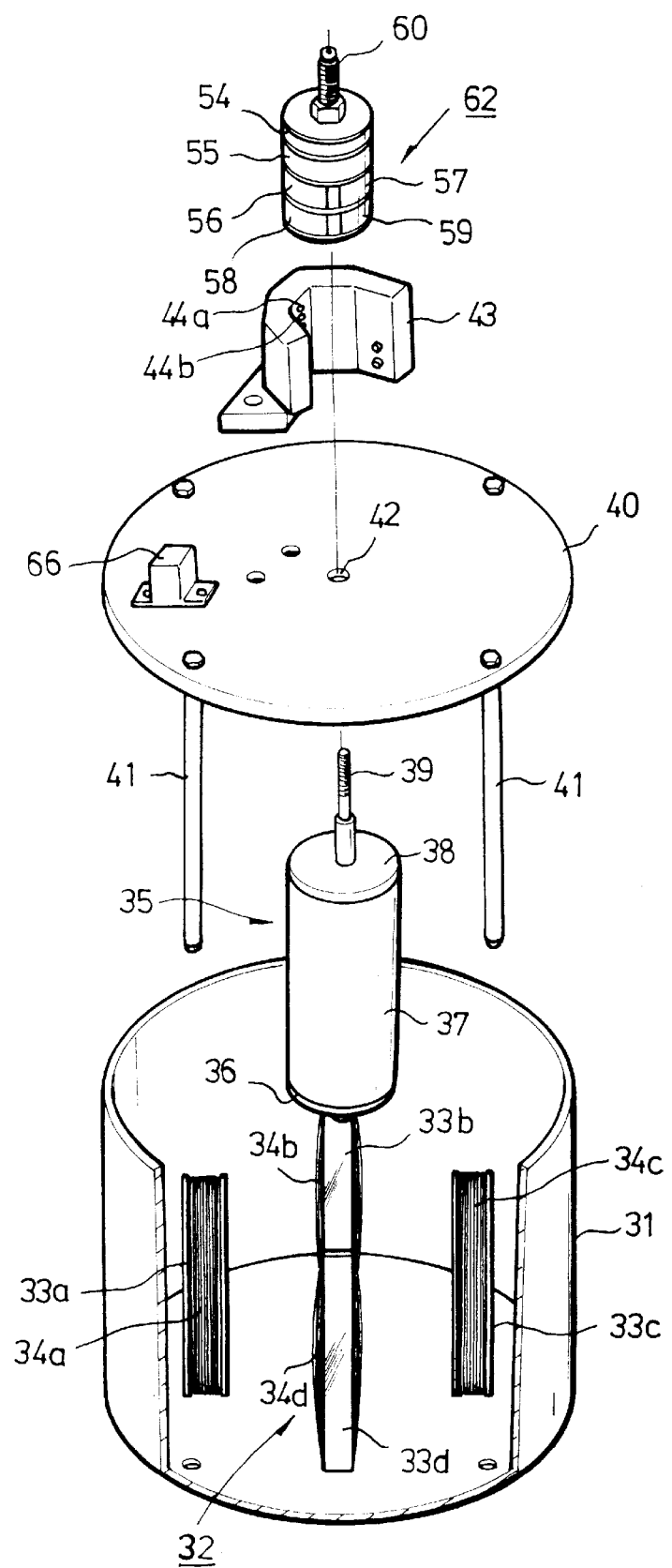
FIG. 3 is a partially exploded perspective view illustrating an electric motor in which a rotor has two polarities, according to one embodiment of the present invention.

FIG. 2 is a perspective view illustrating the combining state of an electric motor according to the present invention. FIG. 3 is a partially exploded perspective view illustrating an electric motor in which a rotor has two polarities of N and S, according to one embodiment of the present invention.

As illustrated in FIGS. 2 and 3, the electric motor of the present invention includes a stator 32 in which first to fourth iron cores 33a~33d are fixably mounted in a main body 31 and first to fourth coils 34a~34d are wound in the first to fourth iron cores 33a~33d, respectively.

In a center portion of the main body 31, a rotor 35 made of a permanent magnet 37 having two polarities N and S is arranged between an upper cover 38 and a lower cover 36. A connecting portion 39 is formed in an integral form with the upper cover 38.

The stator 32 and the rotor 35 are separated from each other by a predetermined distance.

Further, a cover 40 is mounted at an upper portion of the main body 31. The main body 31 and the cover 40 are fixably combined with each other by means of combining members 41. The connecting portion 39 of the rotor 35 is protruded towards the outside of the cover 40 through a piercing hole 42 which is formed in a center portion of the cover 40.

A current converter 62 is screwed to the connecting portion 39 protruded towards the outside of the cover 40. The current converter 62 converts the polarity of current applied to the first to fourth coils 34a~34b.

A brush fixing portion 43 is screwed to the upper portion of the cover 40. First to sixth brushes 46~51 are fixed into the brush fixing portion 43. The first to sixth brushes 46~51 supply main current to the current converter 62 and stably supply the current output from the current converter 62 to the first to fourth coils 34a~34b.

At a predetermined portion on the cover 40, a current supply portion 66 is mounted. The current supply portion 66 is connected with the third to sixth brushes 48~51 and includes a plurality of power transistors to supply current Lo the first to fourth coils 34a~34b.

Figure 4:
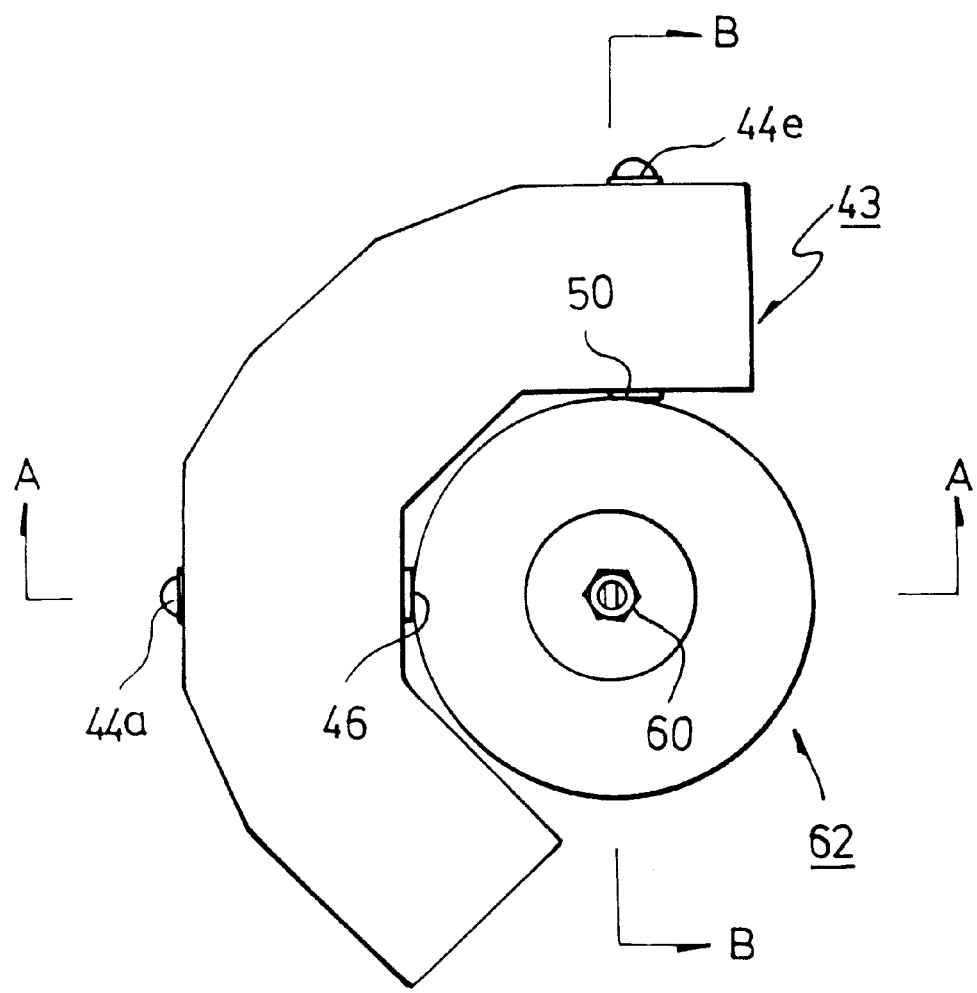
FIG. 4 is a plan view illustrating the arrangement state of a brush fixing portion and a current converter in an electric motor according to the present invention.
Figure 5A:
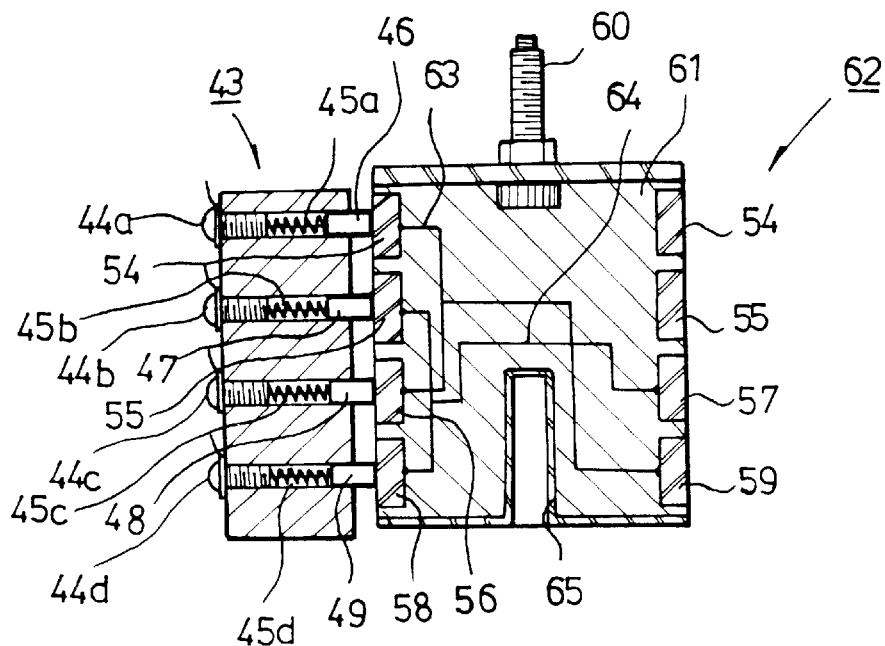
FIG. 5a is a sectional view taken along line A—A of FIG. 4.
Figure 5B:
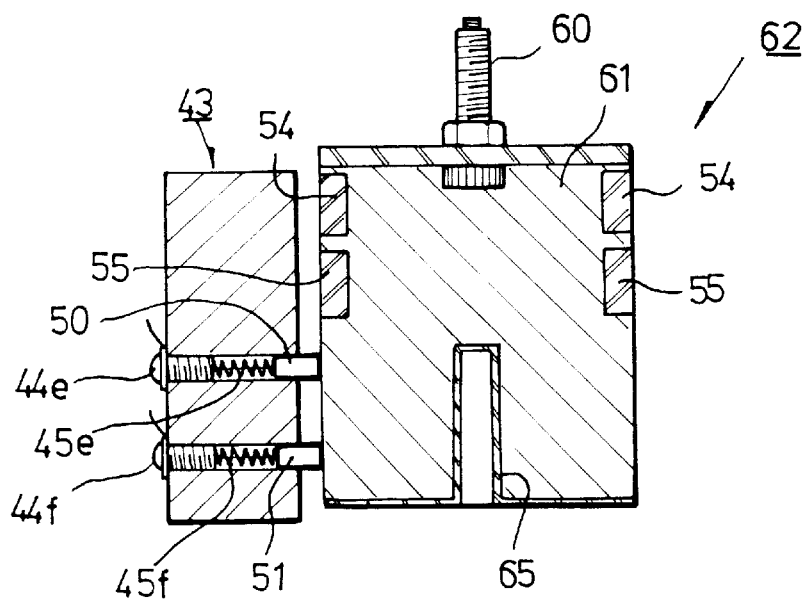
FIG. 5b is a sectional view taken along line B—B of FIG. 4.

FIG. 5a is a sectional view taken along line A—A of FIG. 4. FIG. 5b is a sectional view taken along line B—B of FIG. 4. That is, FIGS. 5a and 5b are sectional views illustrating arrangement states of the brush fixing portion 43 and the current converter 62 in the electric motor according to the present invention, in which the fifth and sixth brushes 50 and 51 are arranged at 90° against the first to fourth brushes 46~49.

Referring to FIG. 5a, the brush fixing portion 43 includes first to fourth terminals 44a~44d, first to fourth springs 45a~45d, and first to fourth brushes 46~49. The first to fourth terminals 44a~44d, the first to fourth springs 45a~45d, and the first to fourth brushes 46~49 are connected with one another by means of cables 63 and 64 to be inserted into a plurality of piercing holes so that the first to fourth brushes 46~49 have elasticity by means of the first to fourth springs 45a~45d.

Figure 7:
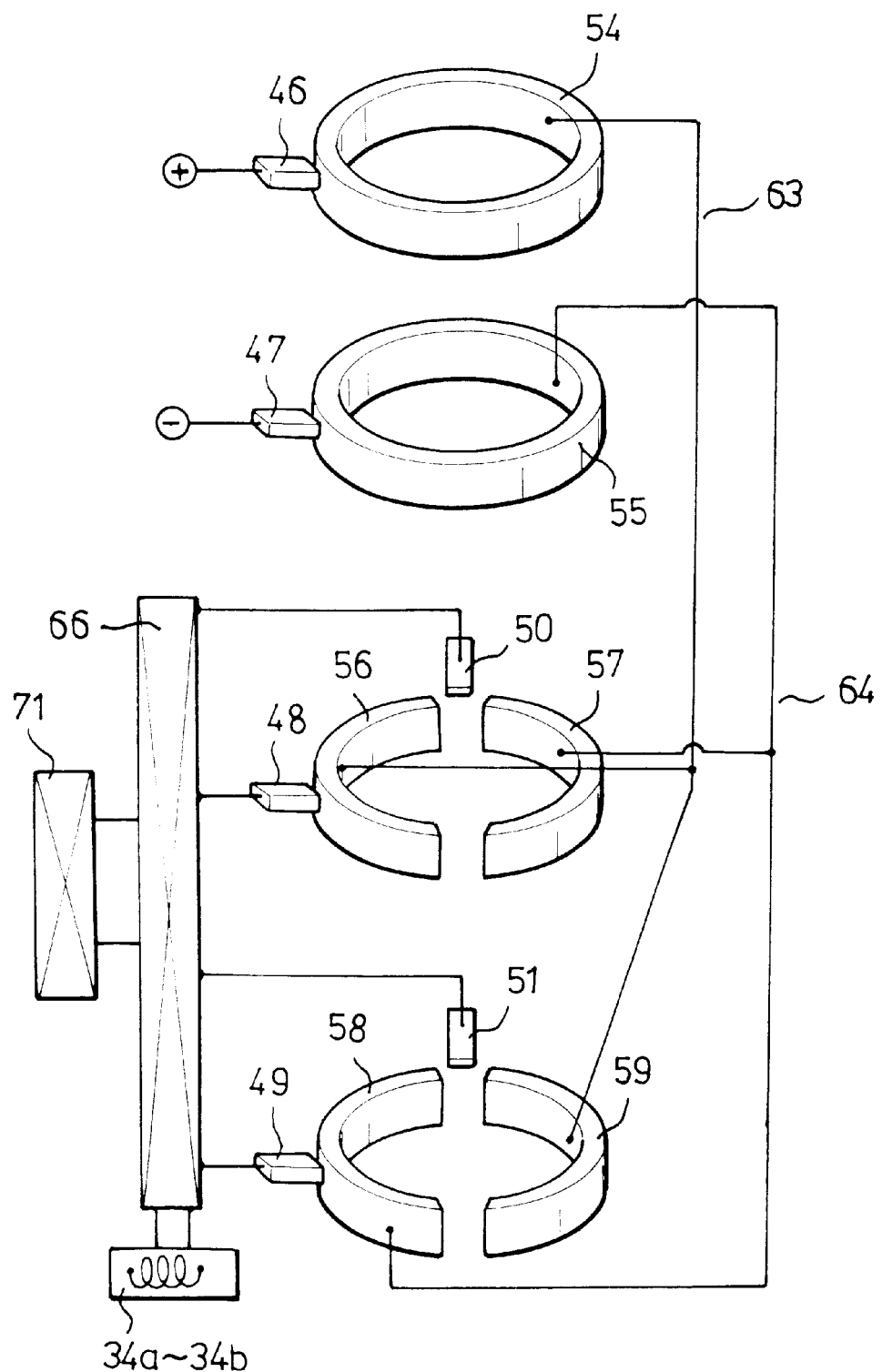
FIG. 7 is a view illustrating inner connection of a current converter in an electric motor in which a rotor has two polarities, according to one embodiment of the present invention.
Figure 8:
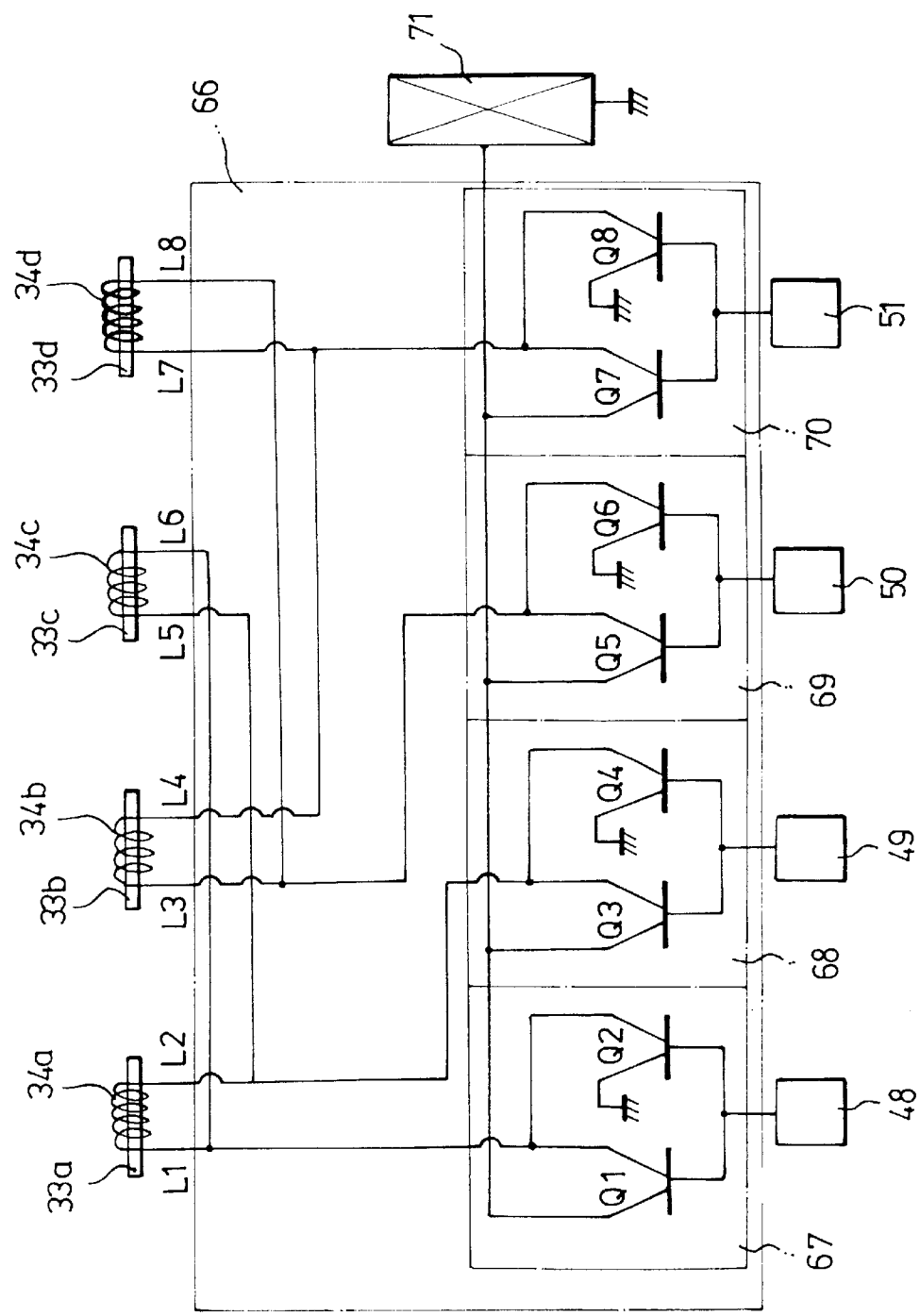
FIG. 8 is a detailed circuit view of a current supply portion illustrating connection relationship between a brush and a coil in an electric motor in which a rotor has two polarities, according to the present invention.

The positive "+" power source is applied to the first terminal 44a, while the negative "–" power source is applied to the second terminal 44b. The current supply portion 66 is connected to the third and fourth terminals 44c and 44d. As illustrated in FIGS. 7 and 8, the current supply portion 66 supplies driving current output from a power source portion 71 to the first to fourth coils 34a~34d.

Referring to FIG. 5b, fifth to sixth terminals 44e and 44f, fifth and sixth springs 45e and 45f, and fifth and sixth brushes 50 and 51 are connected with one another by means of cables to be inserted into the piercing holes formed in the brush fixing portion 43 so that the fifth and sixth brushes 50 and 51 have elasticity by means of the fifth and sixth springs 45e and 45f.

Figure 6:
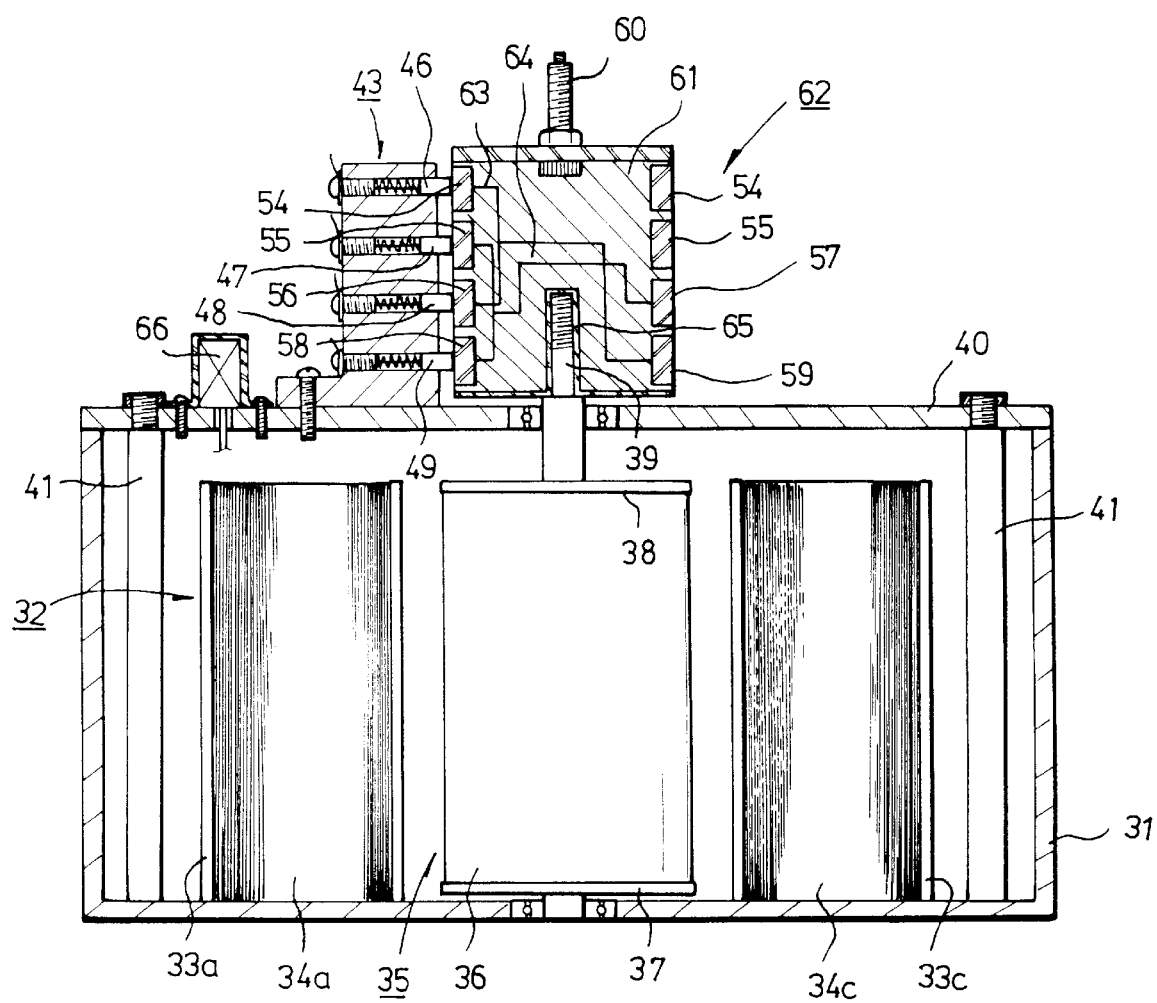
FIG. 6 is a longitudinal-sectional view illustrating the combining state of an electric motor according to the present invention.

FIG. 6 is a longitudinal-sectional view illustrating a combining state of an electric motor according to the present invention. FIG. 7 is a view illustrating inner connection of a current converter in an electric motor in which a rotor has two polarities, according to one embodiment of the present invention.

Connection relationship between the first to sixth brushes 46~51 and first to sixth commutators 54~59 of the current converter 62 will now be described in detail.

The first brush 46 is in contact with the first commutator 54. The second brush 47 is in contact with the second commutator 55. The third brush 48 is in contact with the third and fourth commutators 56 and 57. The fourth brush 49 is in contact with the fifth and sixth commutators 58 and 59.

The fifth brush 50 which is mounted at 90° against the first to fourth brushes 46~49 is in contact with the third and fourth commutators 56 and 57. The sixth brush 51 is in contact with the fifth and sixth commutators 58 and 59.

The positive "+" power source is applied to the first brush 46. The negative "–" power source is applied to the second brush 47. The current supply portion 66, which supplies the power source output from the power source portion 71 to the first to fourth coils 34a~34d, is connected with the other sides of the third to sixth brushes 48~51.

The third and sixth commutators 56 and 59 are connected to the first commutator 54 to which the positive "+" power source is applied by means of the first cable 63. The fourth and fifth commutators 57 and 58 are connected to the second commutator 55 to which the negative "−" power source is applied by means of the second cable 64.

FIG. 8 is a detailed circuit view of the current supply portion 66 illustrating connection relationship between the brushes and the coils in an electric motor in which a rotor has two polarities, according to the present invention.

As illustrated in FIG. 8, the current supply portion 66 includes a first switching portion 67, a second switching portion 68, a third switching portion 69, and a fourth switching portion 70.

The first switching portion 67 includes an NPN first transistor Q1 and a PNP second transistor Q2. An emitter terminal of the first transistor Q1 and an emitter terminal of the second transistor Q2 are connected with each other. The first brush 48 is connected to their base terminals. A collector terminal of the first transistor Q1 is connected to the power source portion 71. A collector terminal of the second transistor Q2 is grounded.

The second to fourth switching portions 68~70 are connected to the fourth to sixth brushes 49~51, respectively. Each of the third, fifth and seventh transistors Q3, Q5 and Q7 of the second to fourth switching portions 68~70 has the same configuration as the transistor Q1 of the first switching portion 67. Likewise, each of the fourth, sixth and eighth transistors Q4, Q6 and Q8 thereof has the same configuration as the transistor Q2 of the first switching portion 67.

Meanwhile, one end L1 of the first coil 34a and one end L6 of the third coil 34c are connected to the emitter terminals of the first and second transistors Q1 and Q2 of the first switching portion 67, respectively. The other end L2 of the first coil 34a and the other end L5 of the third coil 34c are connected to the emitter terminals of the fifth and sixth transistors Q5 and Q6 of the third switching portion 69, respectively.

Figure 9:
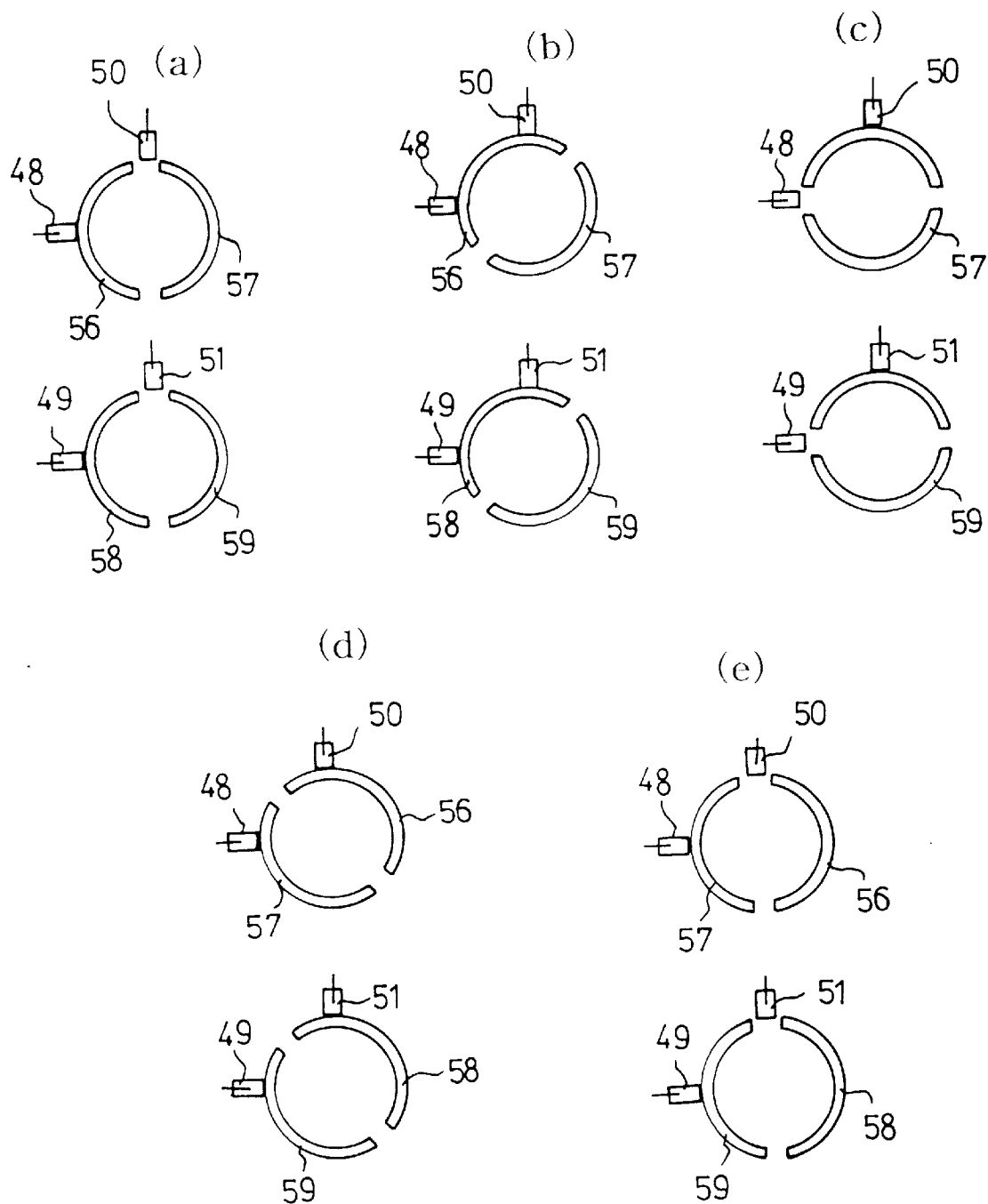
FIG. 9 is a plan view illustrating the state that a commutator and a brush are in contact with each other when rotating a current converter in an electric motor in which a rotor has two polarities, according to one embodiment of the present invention.
Figure 10:
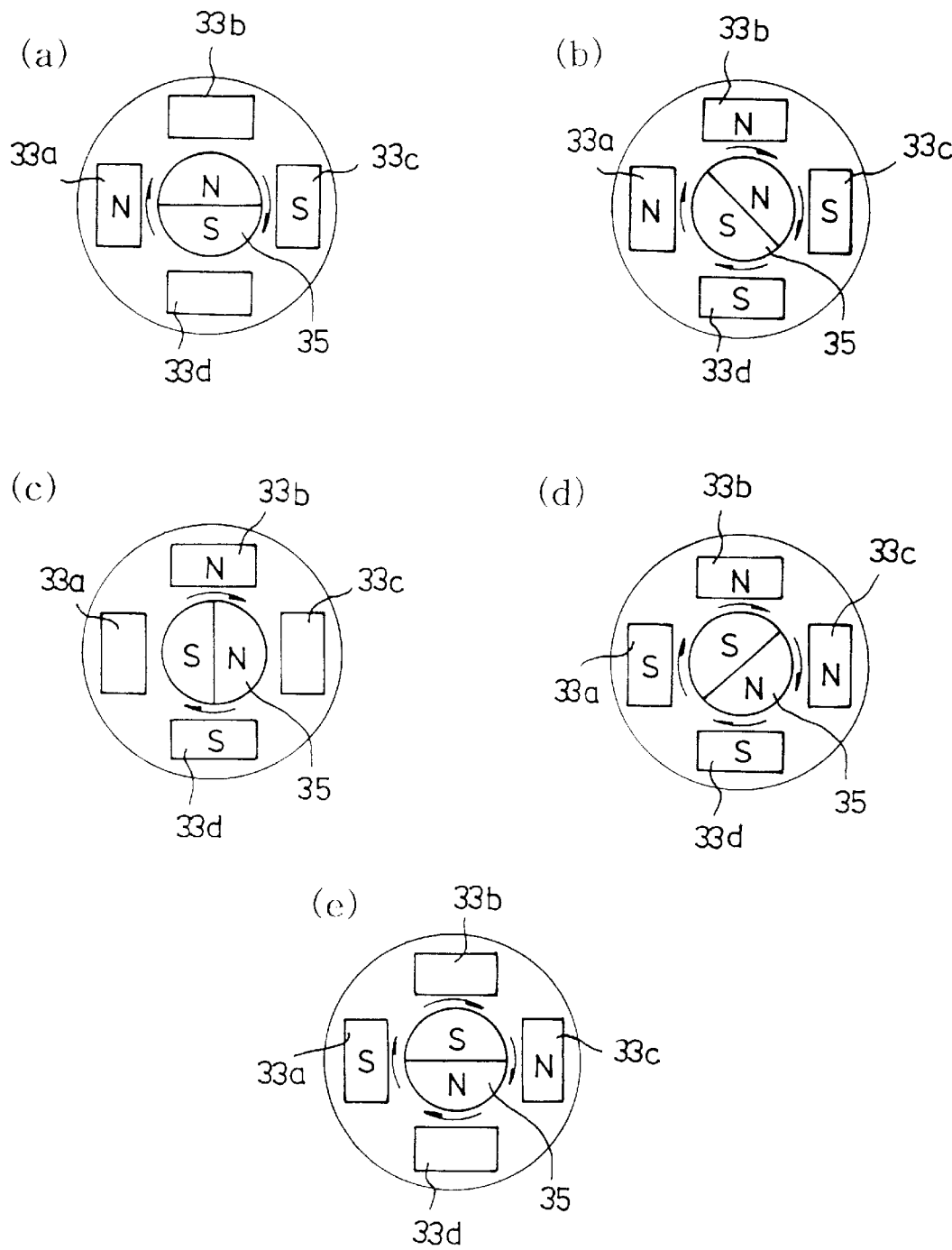
FIGS. 10(a)–(e) are views illustrating the operation steps of a rotor and a stator during rotation in an electric motor in which a rotor has two polarities, according to one embodiment of the present invention.

FIG. 9 is a plan view illustrating the state that a commutator and a brush are in contact with each other when rotating a current converter in an electric motor in which a rotor has two polarities, according to one embodiment of the present invention. FIG. 10 is a view illustrating the operation steps of a rotor and a stator during rotation in an electric motor in which a rotor has two polarities, according to one embodiment of the present invention.

In the electric motor of the present invention, in which the rotor has two polarities, it is assumed that, at the combining state of the electric motor as illustrated in FIGS. 2 and 6, the first to sixth commutators 54~59 of the current converter 62 are arranged as illustrated in FIGS. 7 and 9a, and that the rotor 35 made of the permanent magnet having two polarities of N and S is arranged as illustrated in FIG. 10a. In this respect, the operation steps of the electric motor will be described in detail with reference to FIGS. 2 to 9.

As illustrated in FIG. 7, if the positive "+" power source is applied to the first brush 46, the first commutator 54 which is in contract with the first brush 46 is conducted by the positive "+" polarity. At the same time, the third and sixth commutators 56 and 59 which are connected with each other by the first cable 63 are conducted by the positive "+" polarity. In addition, if the negative "−" power source is applied to the second brush 47, the second commutator 55 which is in contact with the second brush 47 is conducted by the negative "−" polarity. At the same time, the fourth and fifth commutators 57 and 58 which are connected with each other by the second cable 64 are conducted by the negative "−" polarity.

Therefore, as illustrated in FIG. 9a, the third brush 48 is in contact with the third commutator 56 and conducted by the positive "+" polarity, and the fourth brush 49 is conducted by the negative "−" polarity. Thus, the power source is applied to the current supply portion 66. However, the fifth and sixth brushes 50 and 51 are not in contact with any commutators and thus fail to supply the power source to the current supply portion 66.

As illustrated in FIG. 8, if the positive "+" power source is applied to the third commutator 56 and the negative "−" power source is applied to the fourth brush 49, the first and fourth transistors Q1 and Q4 of the first and second switching portions 67 and 68 are to be turned on, while the second and third transistors Q2 and Q3 thereof are to be turned off. Then, the power source output from the power source 71 is applied to the first coil 34a in a forward direction through the collector of the first transistor Q1 and flows to the ground through the fourth transistor Q4. As a result, the first iron core 33a wound by the first coil has N polarity.

At the same time, the power source output from the power source 71 is applied to the third coil 34c through the collector of the first transistor Q1 and flows to the ground through the fourth transistor Q4. The voltage applied to the third coil 34c is applied in reverse direction against the voltage applied to the first coil 34a. As a result, the third iron core 33c has an S polarity.

At this time, as aforementioned, since the power source is not applied to the fifth and sixth brushes 50 and 51, the current does not flow to the second and fourth coils 34b and 34d so that the second and fourth iron cores 33b and 33d do not have any-polarity. As a result, the rotor 35 having two polarities of N and S is rotated by attraction and repulsion between the rotor 35 and the first and third iron cores 33a and 33c only.

In other words, as illustrated in FIG. 10a, attraction occurs between the first iron core 33a of N polarity and the rotor 35 of S polarity, while repulsion occurs between the first iron core 33a of N polarity and the rotor 35 of N polarity. At the same time, attraction occurs between the third iron core 33c of S polarity and the rotor 35 of N polarity, while repulsion occurs between the third iron core 33c of S polarity and the rotor 35 of S polarity. As a result, the rotor 35 rotates clockwise.

If the rotor 35 rotates clockwise, as illustrated in FIG. 6, the current converter 62 rotates clockwise because the connecting portion 39 of the rotor 35 and the combining portion 65 of the current converter 62 are screwed to each other. Thus, the positions of the first to sixth commutators 54~59 of the current converter 62 are varied.

When the rotor 35 rotates at 45° clockwise, the current converter 62 rotates 45° clockwise. In this case, as illustrated in FIG. 9b, the third and fifth brushes 48 and 50 are in contact with the third commutator 56 and conducted by the positive "+" polarity. The fourth and sixth brushes 49 and 51 are in contact with the fifth commutator 58 and conducted by the negative "−" polarity. Thus, the power source is to be applied to the current supply portion 66.

As illustrated in FIG. 8, if the positive "+" power source is applied to the third and fifth brushes 48 and 50 and the negative "−" power source is applied to the fourth and sixth brushes 49 and 51, the first, fourth, fifth and eighth transistors Q1, Q4, Q5 and Q8 of the first to fourth switching portions 67~70 are to be turned on. On the other hand, the second, third, sixth and seventh transistors Q2, Q3, Q6 and Q7 thereof are to be turned off.

Thus, the power source output from the power source portion 71 is applied to the first and second coils 34a and 34b in forward direction, while the power source output from the power source portion 71 is applied to the third and fourth coils 34c and 34d in reverse direction. As a result, the first and second iron cores 33a and 33b have N polarity, while the third and fourth iron cores 33c and 33d have S polarity. Attraction and repulsion occur between the first to fourth iron cores 33a~33d and the rotor 35 having two polarities of N and S so as to strongly rotate the rotor 35.

In other words, as illustrated in FIG. 10b, the first and second iron cores 33a and 33b having N polarity and the third and fourth iron cores 33c and 33d having S polarity generate attraction and repulsion in both S an N polarities of the rotor 35 so that the rotor 35 rotates clockwise at a strong rotative force.

Therefore, if the rotor 35 rotates at 45° clockwise and the current converter 62 rotates at 90°, as illustrated in FIG. 9c, the fifth brush 50 is in contact with the third commutator 55 and conducted by the positive "+" polarity, while the sixth brush 51 is in contact with the sixth commutator 59 and conducted by the negative "−" polarity, so that the power source is applied to the current supply portion 66. However, the third and fourth brushes 48 and 49 are not in contact with any commutators and thus fail to supply the power source to the current supply portion 66.

Therefore, as illustrated in FIG. S, if the positive "+" power source is applied to the fifth brush 50 and the negative "−" power source is applied to the sixth brush 51, the fifth and eighth transistors Q5 and Q8 of the third and fourth switching portions 69 and 70 are turned on, while the sixth and seventh transistors Q6 and Q7 are turned off. As a result, the second iron core 33b has N polarity and the fourth iron core 33d has S polarity.

At this time, as aforementioned, since the power source is not applied to the third and fourth brushes 48 and 49, the first and third iron cores 33a and 33c do not have any polarity. As a result, only the second and fourth iron cores 33b and 33d generate attraction and repulsion in the rotor 35 having two polarities of N and S.

In other words, as illustrated in FIG. 10c, attraction occurs between the second iron core 33b of N polarity and the rotor 35 of S polarity, while repulsion occurs between the second iron core 33b of N polarity and the rotor 35 of N polarity. At the same time, attraction occurs between the fourth iron core 33d of S polarity and the rotor 35 of N polarity, while repulsion occurs between the fourth iron core 33d of S polarity and the rotor 35 of S polarity. As a result, the rotor 35 rotates clockwise.

Therefore, if the rotor 35 rotates at 45° clockwise and thus the current converter 62 rotates 135° clockwise, as illustrated in FIG. 9d, the third and sixth brushes 48 and 51 are in contact with the fourth and fifth commutators 57 and 58 and conducted by the negative "−" polarity. The fourth and fifth brushes 49 and 50 are in contact with the sixth and third commutators 59 and 56 and conducted by the positive "+" polarity. Thus, the power source is to be applied to the current supply portion 66.

As illustrated in FIG. 8, if the positive "+" power source is applied to the fourth and fifth brushes 49 and 50 and the negative "−" power source is applied to the third and sixth brushes 48 and 51, the first, fourth, sixth and seventh transistors Q1, Q4, Q6 and Q7 of the first to fourth switching portions 67~70 are to be turned off. On the other hand, the second, third, fifth and eighth transistors Q2, Q3, Q5 and Q8 thereof are to be turned on.

Thus, the power source output from the power source portion 71 is applied to the first and fourth coils 34a and 34d in reverse direction, while the power source output from the power source portion 71 is applied to the second and third coils 34b and 34c in forward direction. As a result, the first and fourth iron cores 33a and 33d have S polarity, while the second and third iron cores 33b and 33c have N polarity. Attraction and repulsion occur between the first to fourth iron cores 33a~33d and the rotor 35 having two polarities of N and S so as to strongly rotate the rotor 35.

In other words, as illustrated in FIG. 10d, the first and fourth iron cores 33a and 33d having S polarity and the second and third iron cores 33b and 33c generate attraction and repulsion in both S polarity and N polarity of the rotor 35 so that the rotor 35 rotates clockwise at a strong rotative force.

Therefore, if the rotor 35 rotates at 45° clockwise and thus the current converter 62 rotates at 180° from 0° clockwise, as illustrated in FIG. 9e, the third brush 48 is in contact with the fourth commutator 57 and conducted by the negative "−" polarity. The fourth brush 49 is in contact with the sixth commutator 59 and conducted by the positive "+" polarity. Thus, the power source is to be applied to the current supply portion 66. However, the fifth and sixth brushes 50 and 51 are not in contact with any commutator and fail to supply the power source to the current supply portion 66.

As illustrated in FIG. 8, if the negative "−" power source is applied to the third brush 48 and the positive "+" power source is applied to the fourth brush 49, the second and third transistors Q2 and Q3 of the first and second switching portions 67 and 68 are to be turned on. On the other hand, the first and fourth transistors Q1 and Q4 thereof are to be turned off. As a result, contrary to the 0° state of FIG. 7a, the first iron core 33a has S polarity and the third iron core 33c has N polarity. Thus, only the second and fourth iron cores 33c and 33d generate attraction and repulsion in the rotor 35 of two polarities.

In other words, as illustrated in FIG. 10e, repulsion occurs between the first iron core 33a of S polarity and the rotor 35 of S polarity and attraction occurs between the first iron core 33a of S polarity and the rotor 35 of N polarity. At the same time, repulsion occurs between the third iron core 33c of N polarity and the rotor 35 of N polarity and attraction occurs between the third iron core 33a of N polarity and the rotor 35 of S polarity. As a result, the rotor 35 rotates clockwise.

As aforementioned, in the electric motor according to the present invention, in which the rotor has two polarities, the first to fourth iron cores 33a~33d of the stator 32 have variable polarities of two polarities or four polarities in turn whenever the rotor 35 rotates at 45°. On the other hand, the first to fourth iron cores 33a~33d have opposite polarities whenever the rotor 35 rotates at 180°. As a result, attraction and repulsion between the stator and the rotor are enhanced to ascend rotative force of the rotor, thereby providing high rotative force as compared in case that a certain current is applied.

Furthermore, if a permanent magnet of high magnetic density or a permanent magnet of large radius is used as the rotor 35, rotative force ascends so that power consumption can be reduced. Since the first to sixth commutators 54~59 and the first to sixth brushes 46~51 generate weak current which turns on the first to eighth transistors Q1~Q8 of the current supply portion 66, it is possible to remove spark caused by instantaneously applying strong current. As a result, the electric motor of the present invention can maintain a semipermanent life span.

Figure 11:
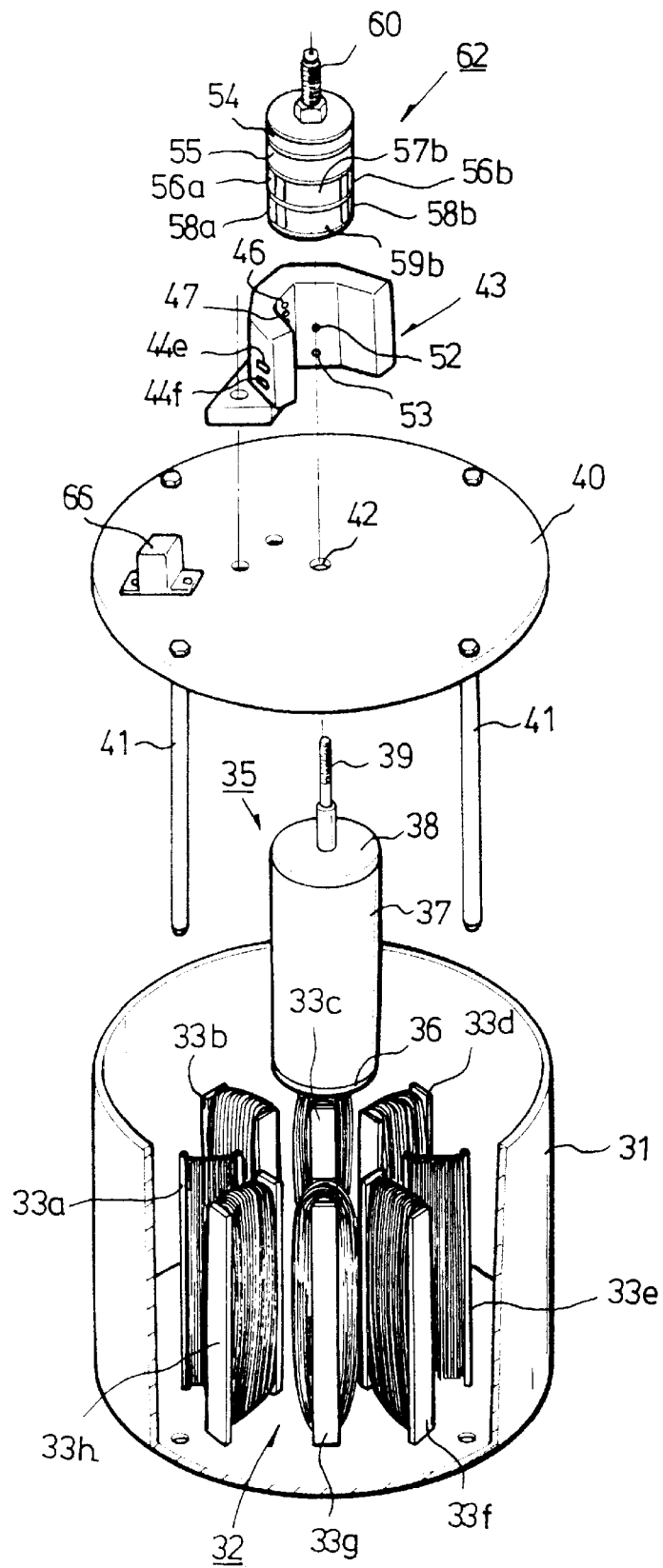
FIG. 11 is a partially exploded perspective view illustrating an electric motor in which a rotor has four polarities, according to other embodiment of the present invention.

FIG. 11 is a partially exploded perspective view illustrating an electric motor in which a rotor has four polarities, according to another embodiment of the present invention.

Referring to FIG. 11, the stator 32 is comprised of the first to eighth iron cores 33a~33h and the first to eighth coils 34a~34h. The first to eighth iron cores 33a~33h are mounted in the main body 31 at a predetermined distance. The first to eighth coils 34a~34h are wound in the first to eighth iron cores 33a~33h, respectively.

In the center portion of the main body 31, the rotor 35 having four polarities of N, S, N and S is arranged between the upper cover 38, which is formed in an integral form with the connecting portion 39, and the lower cover 36. The stator 32 which is comprised of the first to eighth iron cores 33a~33h and the rotor 35 are separated from each other at a predetermined distance. The other elements, that is, the combining member 41, the main body 31, the cover 40, the current converter 62, the current supply portion 66, and the brush fixing portion 43 are mounted in the same manner as those of FIG. 2.

Figure 12:
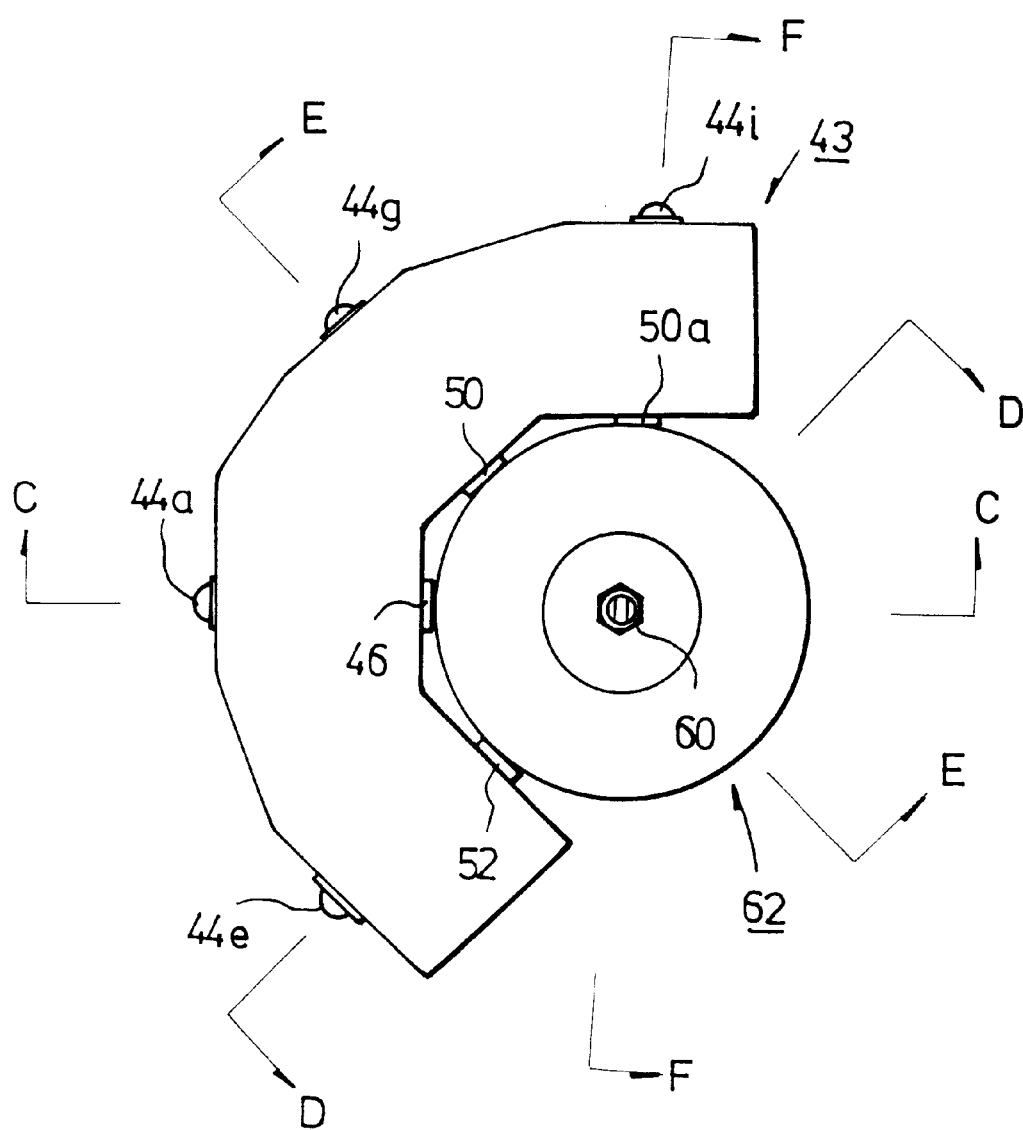
FIG. 12 is a plan view illustrating the arrangement state of a brush fixing portion and a current converter in an electric motor in which a rotor has four polarities, according to the present invention.
Figure 13:
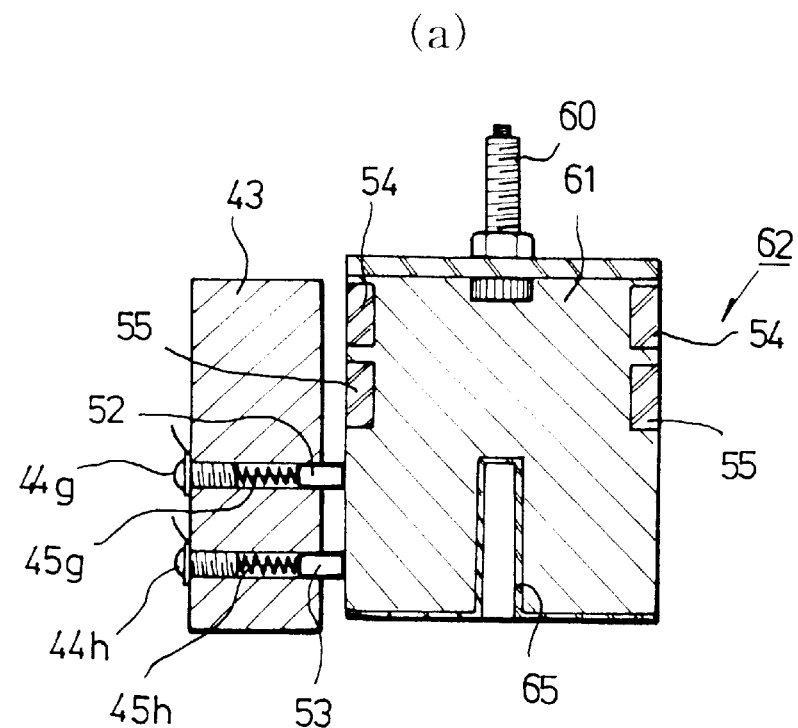
FIGS. 13a to 13d are sectional views taken along line C—C, line D—D, line E—E, and line F—F of FIG. 12.
Figure 13:
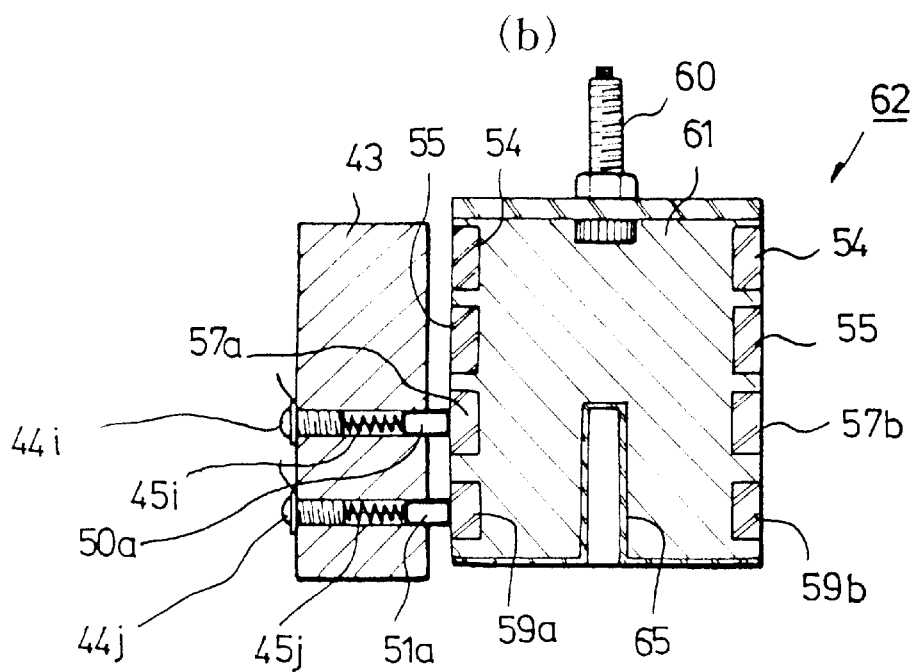
Figure 13:
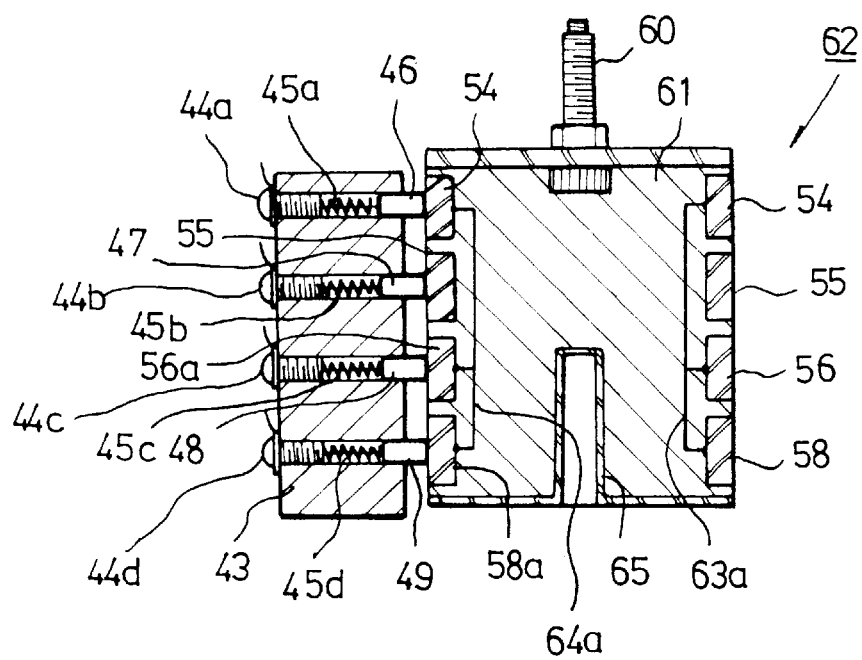
Figure 13:
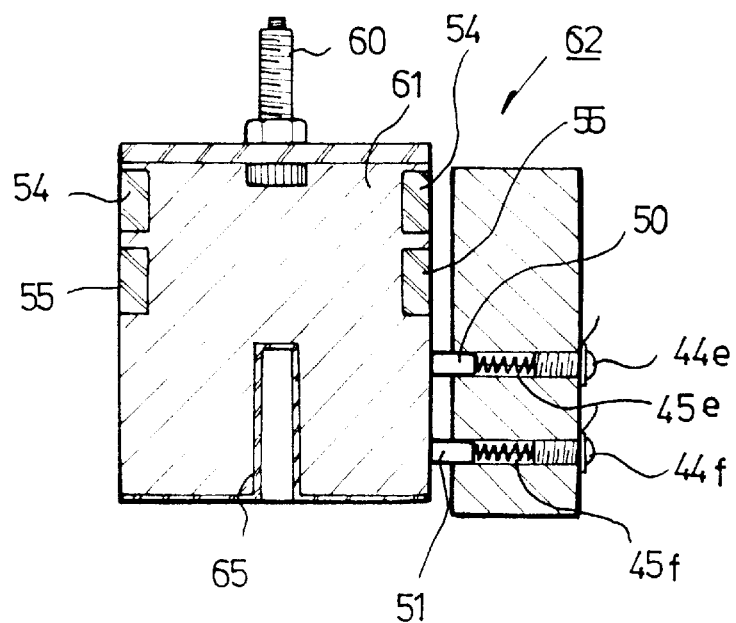

FIG. 12 is a plan view illustrating the arrangement state of the brush fixing portion 43 and the current converter 62 in the electric motor in which the rotor has four polarities, according to the present invention. FIGS. 13a to 13d are sectional views taken along line C—C, line D—D, line E—E, and line F—F of FIG. 12.

Referring to FIG. 12, the fifth and sixth brushes 50 and 51 and the seventh and eighth brushes 52 and 53 against the first to fourth brushes 46~49, and the ninth and tenth brushes 50a and 51a are arranged at 45° from one another, respectively.

In other words, the brush fixing portion 43 is comprised of the first to fourth terminals 44a~44d, the first to fourth springs 45a~45d, and the first to fourth brushes 46~49.

The first to fourth terminals 44a~44b, the first to fourth springs 45a~45d, and the first to fourth brushes 46~49 are connected with one another by means of the cables 63 and 64 to be inserted into the plurality of piercing holes so that the first to fourth brushes 46~49 have elasticity by means of the first to fourth springs 45a~45d.

The positive "+" power source is applied to the first terminal 44a, while the negative "−" power source is applied to the second terminal 44b. The current supply portion 66 is connected to the third and fourth terminals 44c and 44d. The current supply portion 66 supplies driving current output from the power source portion 71 to the first to fourth coils 34a~34d, as illustrated in FIGS. 7 and 8.

Referring to FIG. 13d, the fifth and sixth terminals 44e and 44f, the fifth and sixth springs 45e and 45f, and the fifth and sixth brushes 50 and 51 have the same structures as those of FIG. 13a. The fifth and sixth brushes 50 and 51 are arranged at the front from 45° against the first to fourth brushes 46~49.

Referring to FIG. 13a, the seventh and eighth terminals 44g and 44h, the seventh and eighth springs 45g and 45h, and the seventh and eighth brushes 52 and 53 have the same structures as those of FIG. 13b. The seventh and eighth brushes 52 and 53 are arranged at the rear from 45° against the first to fourth brushes 46~49.

Referring to FIG. 13b, the ninth and tenth terminals 44i and 44j, the ninth and tenth springs 45i and 45j, and the ninth and tenth brushes 50a and 51a have the same structures as those of FIG. 13c. The ninth and tenth brushes 50a and 51a are arranged at 45c against the seventh and eighth brushes 52 and 53.

Figure 14:
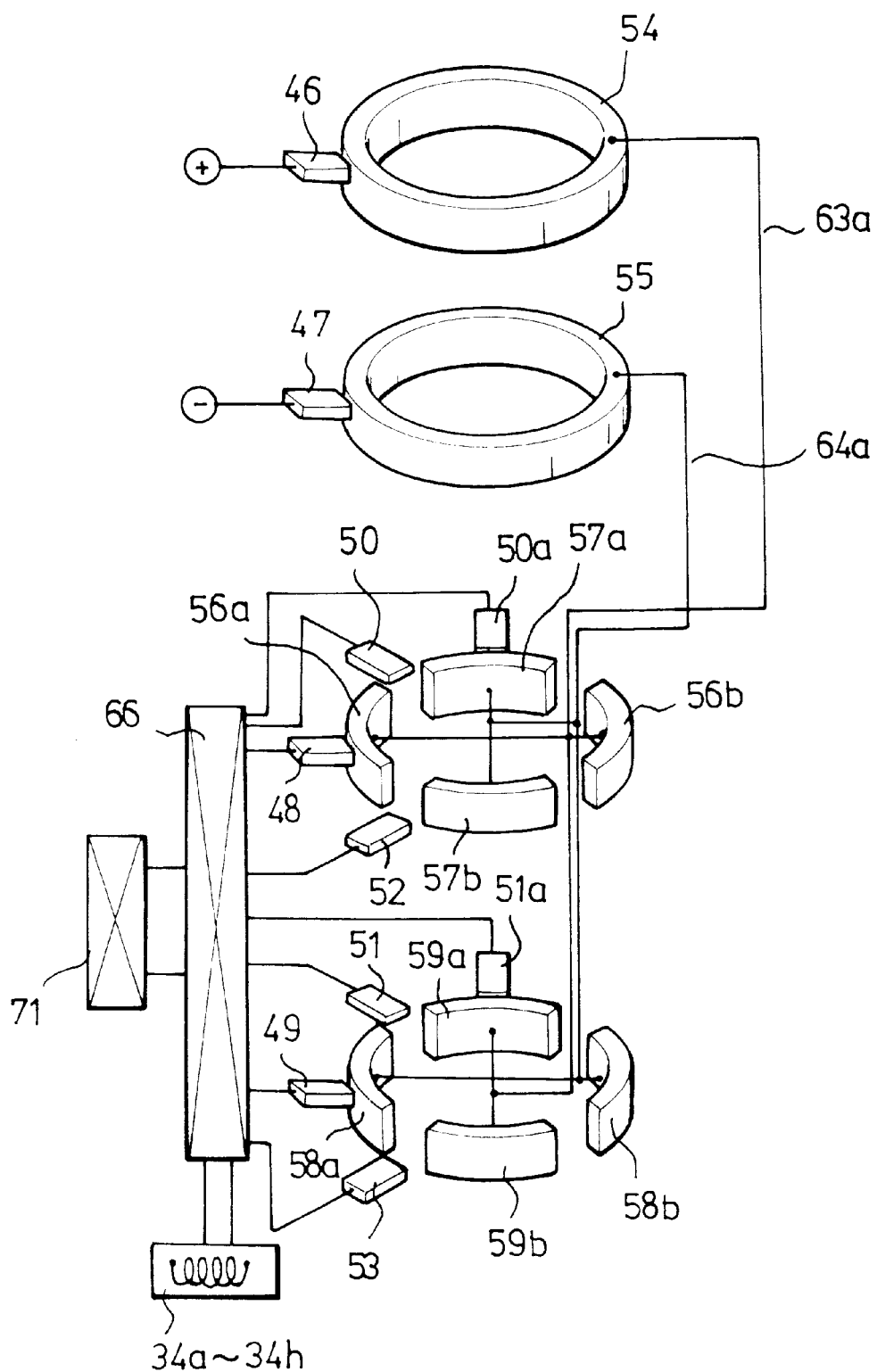
FIG. 14 is a view illustrating inner connection of a current converter in an electric motor in which a rotor has four polarities, according to other embodiment of the present invention.

FIG. 14 is a view illustrating inner connection of the current converter in the electric motor in which the rotor has four polarities, according to another embodiment of the present invention.

Referring to FIG. 14, a ring shaped first commutator 54 is formed with a predetermined width and thickness. The positive "+" power source is applied to the first commutator 54 which is in contact with the first brush 46. A ring shaped second commutator 55 is formed below the first commutator 54 with a predetermined width and thickness. The negative "−" power source is applied to the second commutator 55 which is in contact with the second brush 47.

Seventh to tenth commutators 56a, 56b, 57a and 57b are formed below the second commutator 55 at a predetermined distance. The seventh to tenth commutators 56a, 56b, 57a and 57b are respectively mounted at a predetermined distance in contact with the third, fifth, seventh and ninth brushes 48, 50, 50a and 52a which apply driving signals to the current supply portion 66. In addition, eleventh to fourteenth commutators 58a, 58b, 59a and 59b are mounted below the seventh to tenth commutators 56a, 56b, 57a and 57b at a predetermined distance. The eleventh to fourteenth commutators 58a, 58b, 59a and 59b are respectively in contact with the fourth, sixth, eighth and tenth brushes 49, 51, 53 and 51a which apply driving signals to the current supply portion 66.

Furthermore, the seventh and eighth commutators 56a and 56b and the thirteenth and fourteenth commutators 59a and 59b are connected to the first commutator 54, to which the positive "+" power source is applied, by means of the third cable 63a. The ninth and tenth commutators 57a and 57b and the eleventh and twelfth commutators 58a and 58b are connected to the second commutator 55, to which the negative "−" power source is applied, by means of the fourth cable 64a.

The current supply portion 66, which supplies the driving current output from the power source portion 71 to the first to eighth coils 34a~34h, is connected to the other sides of the third to tenth brushes 49~53, 50a and 51a.

Figure 15:
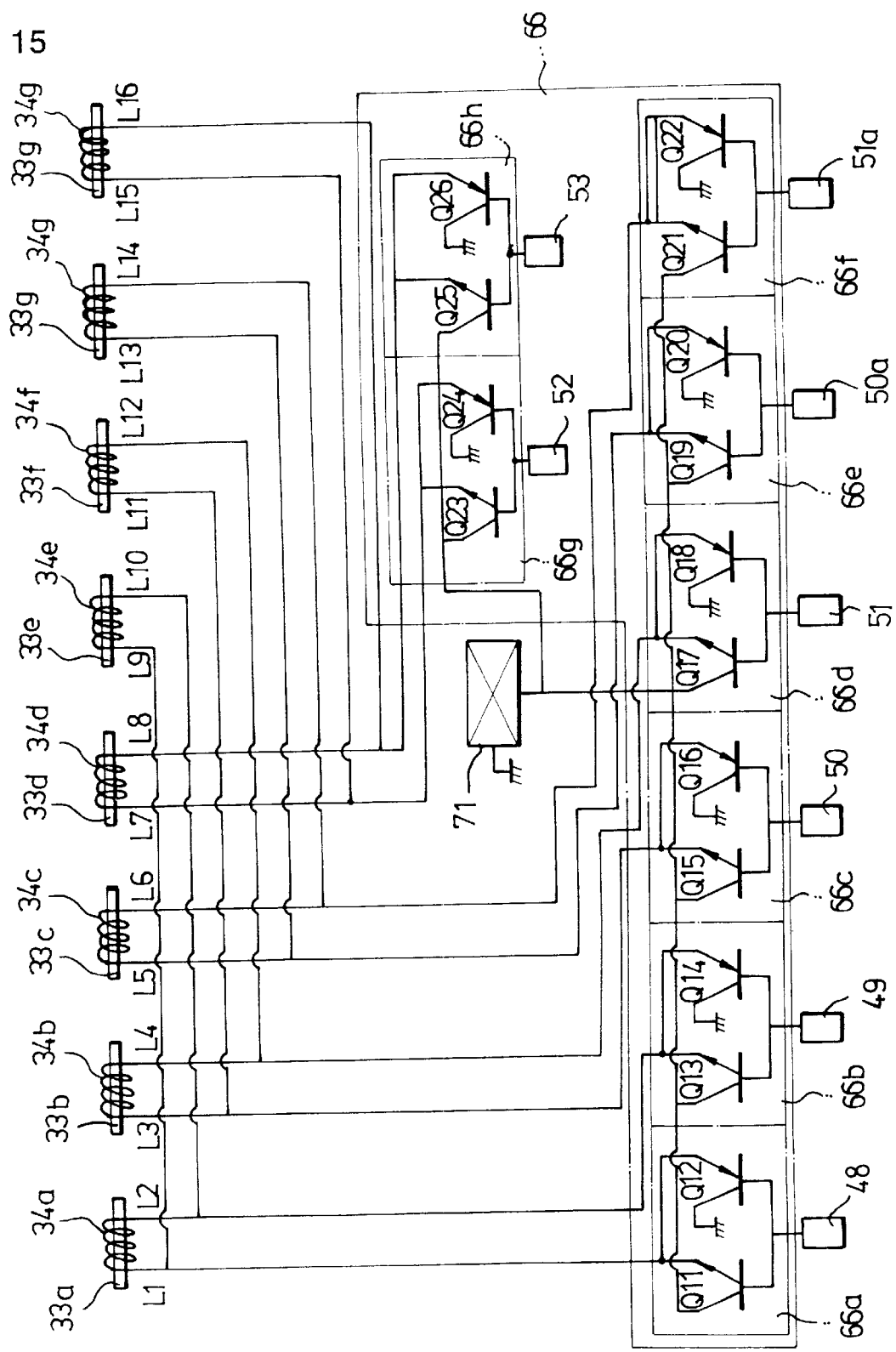
FIG. 15 is a detailed circuit view of a current supply portion illustrating connection relationship between a brush and a coil in an electric motor in which a rotor has four polarities, according to the present invention.

FIG. 15 is a detailed circuit view of the current supply portion illustrating connection relationship between the brushes and the coils in the electric motor in which the rotor has four polarities, according to the present invention.

As illustrated in FIG. 15, the current supply portion 66 includes fifth to twelfth switching portions 66a~66h.

The fifth switching portion 66a includes an NPN eleventh transistor Q11 and a PNP twelfth transistor Q12. An emitter terminal of the eleventh transistor Q11 and an emitter terminal of the twelfth transistor Q12 are connected with each other. The third brush 48 is connected to their base terminals. A collector terminal of the eleventh transistor Q11 is connected to the power source portion 71. A collector terminal of the twelfth transistor Q12 is grounded.

The sixth to twelfth switching portions 66b~66h are connected to the fourth to tenth brushes 49~53, 50a and 51a, respectively. Each of thirteenth to twenty-sixth transistors Q13, ~Q26 of the sixth to twelfth switching portions 66b~66h has the same configuration as those of the fifth switching portion 66a, respectively.

Meanwhile, one end L1 of the first coil 34a and one end L9 of the fifth coil 34e are connected to the emitter terminals of the eleventh and twelfth transistors Q11 and Q12 of the fifth switching portion 66a, respectively. The other end L2 of the first coil 34a and the other end L10 of the fifth coil 34e are connected to the emitter terminals of the thirteenth and fourteenth transistors Q13 and Q14 of the sixth switching portion 66b, respectively.

Further, one end L3 of the second coil 34b and one end L11 of the sixth coil 34f are connected to the emitter terminals of the fifth and sixth transistors Q15 and Q16 of the seventh switching portion 66c, respectively. The other end L4 of the second coil 34b and the other end L12 of the sixth coil 34f are connected to the emitter terminals of the seventeenth and eighteenth transistors Q17 and Q18 of the eighth switching portion 66d, respectively.

One end L5 of the third coil 34c and one end L13 of the seventh coil 34g are connected to the emitter terminals of the nineteenth and twentieth transistors Q19 and Q20 of the ninth switching portion 66e, respectively. The other end L6 of the third coil 34c and the other end L14 of the seventh coil 34g are connected to the emitter terminals of the twenty-first and twenty-second transistors Q21 and Q22 of the tenth switching portion 66f, respectively.

Also, one end L7 of the fourth coil 34d and one end L15 of the eighth coil 34h are connected to the emitter terminals of the twenty-third and twenty-fourth transistors Q23 and Q24 of the eleventh switching portion 66g, respectively. The other end L8 of the fourth coil 34d and the other end L16 of the eighth coil 34h are connected to the emitter terminals of the twenty-fifth and twenty-sixth transistors Q25 and Q26 of the twelfth switching portion 66h, respectively.

Figure 16:
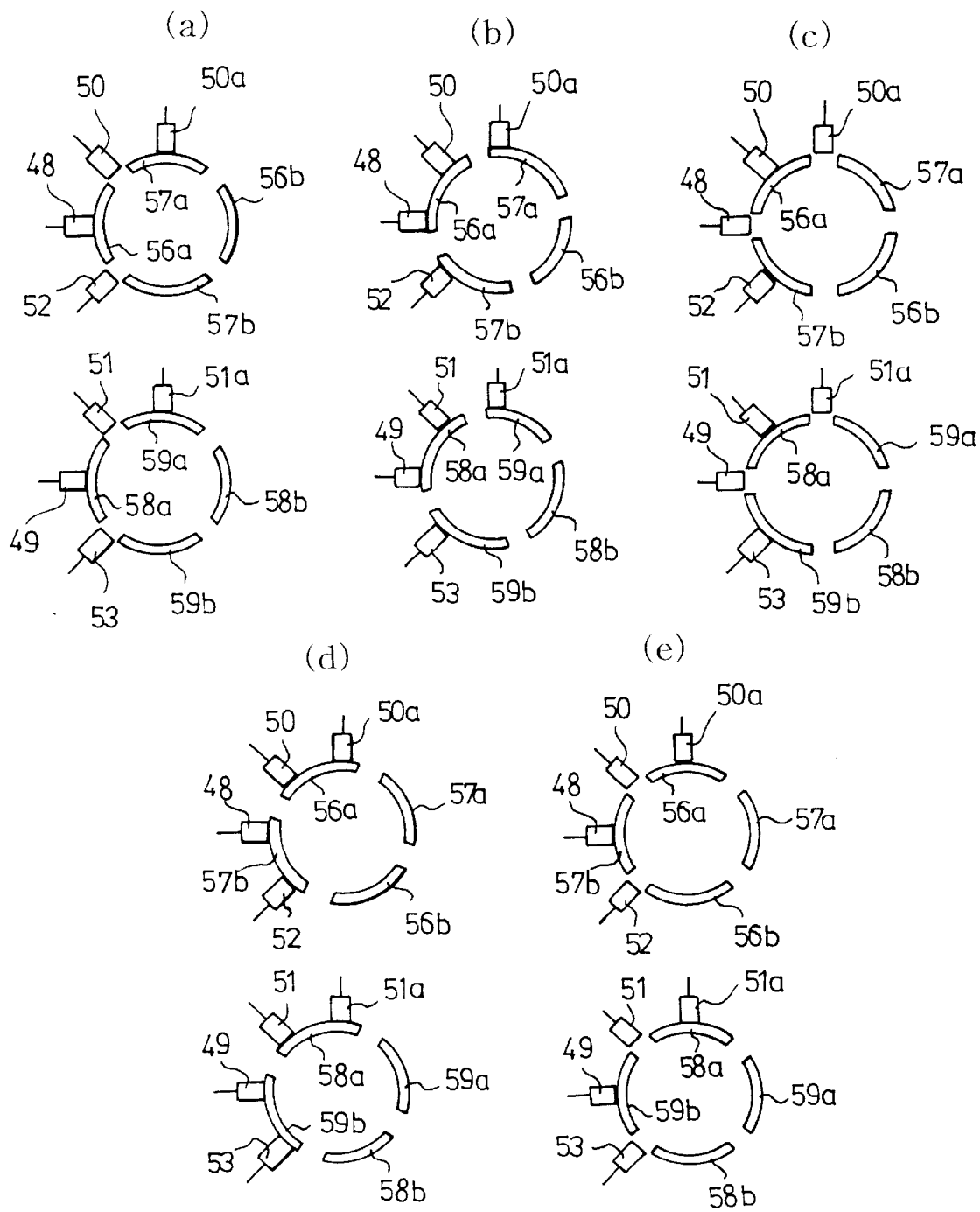
FIGS. 16(a)–(e) are plan views illustrating the states that a commutator and a brush are in contact with each other when rotating a current converter in an electric motor in which a rotor has four polarities, according to one embodiment of the present invention.
Figure 17:
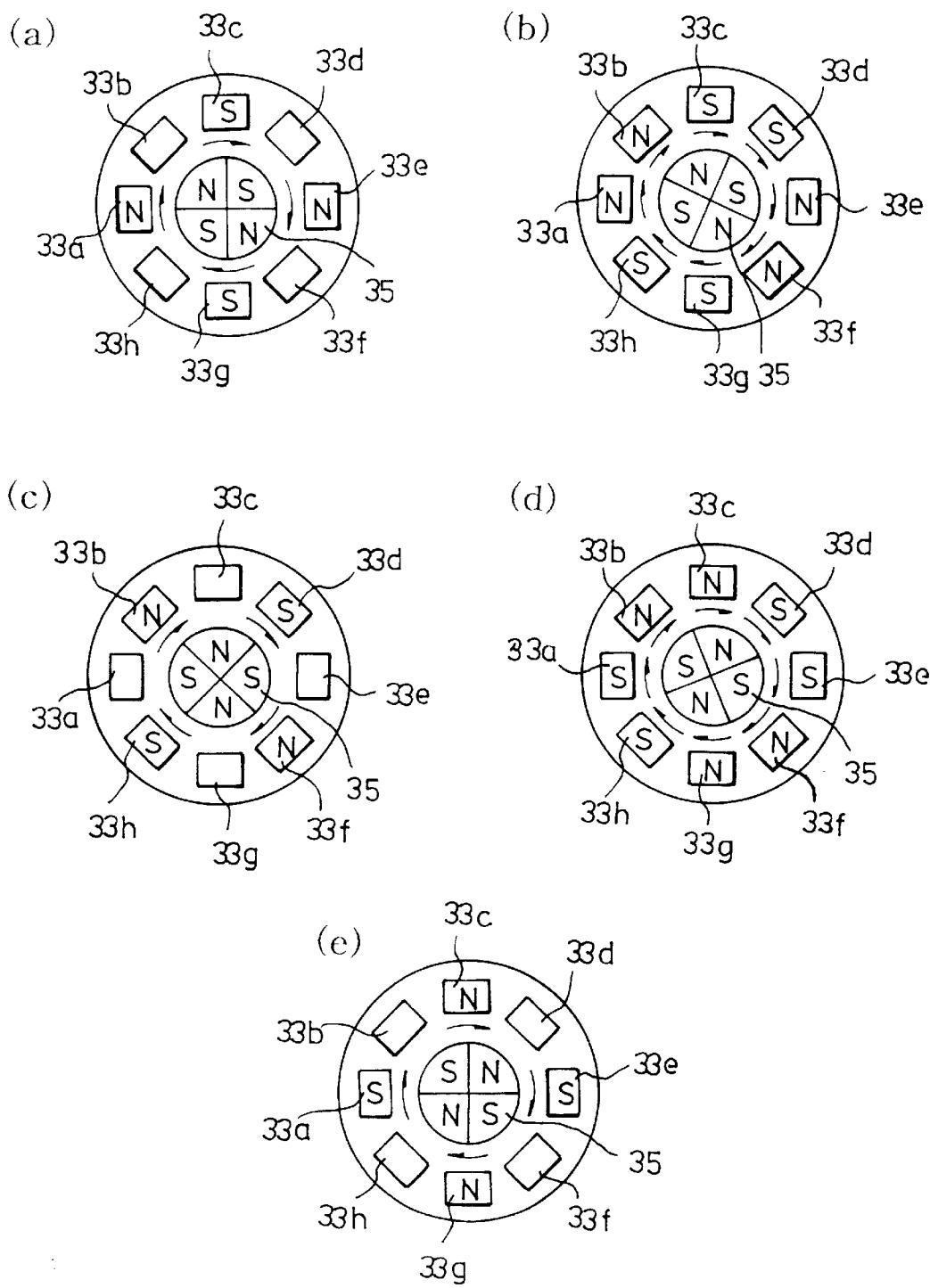
FIGS. 17(a)–(e) are views illustrating the operation steps of a rotor and a stator during rotation in an electric motor in which a rotor has four polarities, according to one embodiment of the present invention.

FIG. 16 is a plan view illustrating when the commutator and the brush are in contact with each other when rotating the current converter in the electric motor in which the rotor has four polarities, according to one embodiment of the present invention. FIG. 17 is a view illustrating the operation steps of the rotor and the stator during rotation in the electric motor in which the rotor has four polarities, according to one embodiment of the present invention.

In the aforementioned electric motor according to other embodiment of the present invention, in which the rotor has four polarities, it is assumed that the seventh to fourteenth commutators 56a, 56b, 57a, 57b, 58a, 58b, 59a and 59b of the current converter 62 are arranged as illustrated in FIGS. 14 and 16a, and that the rotor 35 made of the permanent magnet having four polarities of N, S, N and S is arranged as illustrated in FIG. 17a. In this respect, the operation steps of the electric motor will be described in detail with reference to FIGS. 11 to 17.

As illustrated in FIG. 14, if the positive "+" power source is applied to the first brush 46, the first commutator 54 which is in contact with the first brush 46 is conducted by the positive "+" polarity. At the same time, the seventh, eighth, thirteenth and fourteenth commutators 56a, 56b, 59a and 59b are conducted by the positive "+" polarity, respectively, by means of the third cable 63a. In the meantime, if the negative "−" power source is applied to the second brush 47, the second commutator 55 which is in contact with the second brush 47 is conducted by the negative "−" polarity. At the same time, the ninth, tenth, eleventh and twelfth commutators 57a, 57b, 58a and 58b are conducted by the negative "−" polarity, respectively, by means of the fourth cable 64a.

Therefore, the third brush 48 and fourth brush 51a are in contact with the seventh and thirteenth commutators 56a and 59a and then conducted by the negative "−" polarity, as illustrated in FIG. 16a. The seventh and fourth brushes 50a and 49 are in contact with the ninth and eleventh commutators 57a and 58a and then conducted by the negative "−" polarity, respectively, so that the power source is applied to the current supply portion 66. However, the fifth, sixth, ninth and tenth brushes 50~53 are not in contact with any commutator and thus fail to supply the power source to the current supply portion 66.

As illustrated in FIG. 15, if the positive "+" power source is applied to the third and eighth brushes 48 and 51a and the negative "−" power source is applied to the fourth and seventh brushes 49 and 50a, the eleventh, fourteenth, twentieth and twenty first transistors Q11, Q14, Q20 and Q21 of the fifth, sixth, ninth and tenth switching portions 66a, 66b, 66e and 66f are to be turned on, while the twelfth, thirteenth, nineteenth and twenty-second transistors Q12, Q13, Q19 and Q22 are to be turned off.

Thus, the power source output from the power source 71 is applied to the first and fifth coils 34a and 34e in forward direction through the collector of the eleventh transistor Q11 and flows to the ground through the fourteenth transistor Q14. As a result, the first and fifth iron cores 33a and 33e wound by the first and fifth coils 34a and 34e have N polarity.

At the same time, the power source output from the power source 71 is applied to the third and seventh coils 34c and 34g in reverse direction through the collector of the twenty-first transistor Q21 and flows to the ground through the twentieth transistor Q20. As a result, the third and seventh iron cores 33c and 33g wound by the third and seventh coils 34c and 34g have S polarity.

At this time, as aforementioned, since the power source is not applied to the fifth to eighth brushes 50~53, the current does not flow to the second and fourth coils 34b and 34d and the sixth and eight coils 34f and 34h so that the second, fourth, sixth and eighth iron cores 33b, 33d, 33f and 33h do not have any polarity. As a result, the rotor 35 having four polarities is rotated clockwise by attraction and repulsion between the permanent magnet of the rotor 35 and the first, third, fifth and seventh iron cores 33a, 33c, 33e and 33g.

If the rotor 35 rotates clockwise, as illustrated in FIG. 6, the current converter 62 rotates clockwise because the connecting portion 39 of the rotor 35 and the combining portion 65 of the current converter 62 are screwed to each other. Thus, the positions of the seventh to fourteenth commutators 56a, 56b, 57a, 57b, 58a, 58b, 59a and 59b of the current converter 62 are varied.

When the rotor 35 rotates at 22.5° clockwise, the current converter 62 rotates 22.5° clockwise, too. In this case, as illustrated in FIG. 16b, the third and fifth brushes 48 and 50 are in contact with the seventh commutator 56a and the eighth and tenth brushes 51a and 53 are in contact with the thirteenth and fourteenth commutators 59a and 59b, respectively, so that the third, fifth, eighth and tenth brushes are conducted by the positive "+" polarity.

At the same time, the seventh and ninth brushes 50a and 52 are in contact with the ninth and tenth commutators 57a and 57b, respectively. Each of the fourth and sixth brushes 49 and 51 are in contact with the eleventh commutator 58a. As a result, the fourth, sixth, seventh and ninth brushes 49, 51, 50a and 52 are conducted by "−" polarity.

Therefore, if the positive "+" power source is applied to the third, fifth, eighth and tenth brushes 48, 50, 51a and 53 and the negative "−" power source is applied to the fourth, sixth, seventh and ninth brushes 49, 51, 50a and 52, the eleventh, fourteenth, fifteenth, eighteenth, twentieth, twenty-first, twenty-fourth and twenty-fifth transistors Q11, Q14, Q15, Q18, Q20, Q21, Q24 and Q25 of the fifth to twelfth switching portions 66a~66h are to be turned on, as illustrated in FIG. 15. On the other hand, the twelfth, thirteenth, sixteenth, seventeenth, nineteenth, twenty-second, twenty-third and twenty-sixth transistors Q12, Q13, Q16, Q17, Q19, Q22, Q23 and Q26 are to be turned off.

Thus, the power source output from the power source portion 71 is applied to the first, fifth, second and sixth coils 34a, 34e, 34b and 34f in forward direction through the collectors of the eleventh and fifteenth transistors Q11 and Q15 and then flows to the ground through the fourteenth and eighteenth transistors Q14 and Q18. While, the power source output from the power source portion 71 is applied to the third, fourth, seventh and eighth coils 34c, 34d, 34g and 34h in reverse direction through the collectors of the twenty-first and twenty-fifth transistors Q21 and Q25 and then flows to the ground through the twentieth and twenty-fourth transistors Q20 and Q24.

As a result, the first, fifth, second and sixth iron cores 33a, 33e, 33b and 33f wound by the first, fifth, second and sixth coils 34a, 34e, 34b and 34f have N polarity, while the third, seventh, fourth and eighth iron cores 33c, 33g, 33d and 33h wound by the third, seventh, fourth and eighth coils 34c, 34g, 34d and 34h have S polarity.

Therefore, as illustrated in FIG. 17b, since the first to eighth iron cores 33a~33h have polarities, they generate strong attraction and repulsion in both S an N polarities of the rotor 35 so as to rotate the rotor 35 clockwise.

In the meantime, if the rotor 35 rotates at 22.5° clockwise and then rotates at 45°, the current converter 62 rotates clockwise in the same manner. In this case, as illustrated in FIG. 16c, the fifth brush 50 and the ninth brush 52 are in contact with the seventh commutator 56a and the tenth commutator 57b, respectively. The sixth brush 51 and the tenth brush 53 are in contact with the eleventh commutator 58a and the fourteenth commutator 59b, respectively. As a result, the fifth and tenth brushes 50 and 53 are conducted by the positive "+" polarity, while the sixth and ninth brushes 51 and 52 are conducted by the negative "−" polarity, so that the power source is applied to the current supply portion 66.

However, the third, seventh, fourth and eighth brushes 48, 50a, 49 and 51a are not in contact with any commutator and thus fail to supply the power source to the current supply portion 66.

Therefore, as illustrated in FIG. 15, the fifteenth, eighth, twenty-fourth and twenty-fifth transistors Q15, Q18, Q24 and Q25 of the seventh, eighth, eleventh and twelfth switching portions 66c, 66d, 66g and 66h are turned on, while the sixth, seventh, twenty-third and twenty-sixth transistors Q16, Q17, Q23 and Q26 are turned off.

Then, the power source output from the power source portion 71 is applied to the second and sixth coils 34b and 34f in forward direction through the collector of the fifteenth transistor Q15 and flows to the ground through the eighteenth transistor Q18. Meanwhile, the power source from the power source portion 71 is applied to the fourth and eighth coils 34d and 34h in reverse direction through the collector of the twenty-fifth transistor Q25 and flows to the ground through the twenty-fourth transistor Q24. As a result, the second and sixth cores 33b and 33f wound by the second and sixth coils 34d and 34f have N polarity and the fourth and eighth iron cores 33d and 33h wound by the fourth and eighth coils 34d and 34h have S polarity.

At this time, as aforementioned, since the power source is not applied to the third, seventh, fourth and eighth brushes 48, 50a, 49 and 51a, the first, third, fifth and seventh iron cores 33a, 33c, 33e and 33g do not have any polarity. As a result, as illustrated in FIG. 17c, the second, fourth, sixth and eighth iron cores 33b, 33d, 33f and 33h generate attraction and repulsion in the rotor 35 having four polarities, so that the rotor 35 rotates clockwise.

If the rotor 35 rotates at 22.5° clockwise and then rotates at 67.5°, the current converter 62 rotates at 67.5° clockwise in the same manner. In this case, as illustrated in FIG. 16d, the fifth and seventh brushes 50 and 50a are in contact with the seventh commutator 56a. The fourth and tenth brushes 49 and 53 are in contact with the fourteenth commutator 59b. The third and ninth brushes 48 and 52 are in contact with the tenth commutator 57b. The sixth and eighth brushes 51 and 51a are in contact with the eleventh commutator 58a. As a result, the fifth, seventh, fourth and tenth brushes 50, 50a, 49 and 53 are conducted by the positive "+" polarity, while the third, ninth, sixth and eighth brushes 48, 52, 51, 51a are conducted by the negative "−" polarity.

Then, as illustrated in FIG. 15, the twelfth, thirteenth, fifteenth, eighteenth, nineteenth, twenty-second, twenty-fourth and twenty-fifth transistors Q12, Q13, Q15, Q18, Q19, Q22, Q24 and Q25 of the fifth to twelfth switching portions 66a~66h are turned on, while the eleventh, fourteenth, sixteenth, seventeenth, twentieth, twenty-first, twenty-third and twenty-sixth transistors Q11, Q14, Q16, Q17, Q20, Q21, Q23 and Q26 are turned off.

Thus, the power source output from the power source portion 71 is applied to the second, sixth, third and seventh coils 34b, 34f, 34c and 34g in forward direction through the collectors of the fifteenth and nineteenth transistors Q15 and Q19 and then flows to the ground through the twelfth and twenty-second transistors Q12 and Q22. While, the power source output from the power source portion 71 is applied to the first, fifth, fourth and eighth coils 34a, 34e, 34d and 34h in reverse direction through the collectors of the thirteenth and twenty-fifth transistors Q13 and Q25 and then flows to the ground through the twelfth and twenty-fourth transistors Q12 and Q24.

As a result, the second, sixth, third and seventh iron cores 33b, 33f, 33c and 33g wound by the second, sixth, third and seventh coils 34b, 34f, 34c and 34g have N polarity, while the first, fifth, fourth and eighth iron cores 33a, 33e, 33d and 33h wound by the first, fifth, fourth and eighth coils 34a, 34e, 34d and 34h have S polarity.

Therefore, as illustrated in FIG. 17d, since the first to eighth iron cores 33a~33h have polarities, they generate strong attraction and repulsion in the permanent magnet of the rotor 35 having four polarities so as to rotate the rotor 35 clockwise.

In the meantime, if the rotor 35 rotates at 22.5° clockwise and then rotates 90°, the current converter 62 rotates 90° clockwise, too. In this case, as illustrated in FIG. 16e, the seventh and fourth brushes 50a and 49 are in contact with the seventh and fourteenth commutators 56a and 59b, respectively. The third and eighth brushes 48 and 51a are in contact with the tenth and eleventh commutators 57b and 58a, respectively. As a result, the seventh and fourth brushes 50a and 49 are conducted by the positive "+" polarity, while the third and eighth brushes 48 and 51a are conducted by the negative "−" polarity, so that the power source is applied to the current supply portion 66.

However, the fifth, ninth, sixth and tenth brushes 50, 52, 51 and 53 are not in contact with any commutator and thus fail to supply the power source to the current supply portion 66.

Therefore, as illustrated in FIG. 15, the twelfth, thirteenth, nineteenth and twenty-second transistors Q12, Q13, Q19 and Q22 of the fifth, sixth, ninth and tenth switching portions 66a, 66b, 66e and 66f are turned on, while the eleventh, fourteenth, twentieth and twenty-first transistors Q11, Q14, Q20 and Q21 are turned off.

Then, the power source output from the power source portion 71 is applied to the first and fifth coils 34a and 34e in reverse direction through the collector of the thirteenth transistor Q13 and flows to the ground through the eleventh transistor Q11. Meanwhile, the power source from the power source portion 71 is applied to the third and seventh coils 34c and 34g in forward direction through the collector of the nineteenth transistor Q19 and flows to the ground through the twenty-second transistor Q22. As a result, the first and fifth iron cores 33a and 33e wound by the first and fifth coils 34a and 34e have S polarity and the third and seventh iron cores 33c and 33g wound by the third and seventh coils 34c and 34g have N polarity.

At this time, as aforementioned, since the power source is not applied to the fifth, ninth, sixth and tenth brushes 50, 52, 51 and 53, the current does not flow to the second, fourth, sixth and eighth coils 34b, 34d, 34f and 34h, so that the second, fourth, sixth and eighth coils 33b, 33d, 33f and 33h do not have any polarity. As a result, as illustrated in FIG. 17e, the first, third, fifth and seventh iron cores 33a, 33c, 33e and 33g generate attraction and repulsion in the permanent magnet of the rotor 35 having four polarities, so that the rotor 35 rotates clockwise.

As aforementioned, in the electric motor of the present invention, in which the rotor 35 has four polarities, the first to eighth iron cores 33a~33h of the stator 32 have variable polarities of four polarities or eight polarities in turn whenever the rotor 35 rotates at 22.5°. On the other hand, the first to eighth iron cores 33a~33h have opposite polarities whenever the rotor 35 rotates at 90°. As a result, attraction and repulsion between the stator and the rotor are enhanced to ascend rotative force of the rotor.

Furthermore, if a permanent magnet of high magnetic density or a permanent magnet of large radius is used as the rotor 35, rotative force ascends so that power consumption can be reduced. Since the seventh to fourteenth commutators 56a, 56b, 57a, 57b, 58a, 58b, 59a and 59b and the third to tenth brushes 49~53, 50a and 51a generate weak current which turns on the eleventh to twenty-sixth transistors Q11~Q26 of the current supply portion 66, it is possible to remove spark caused by instantaneously applying strong current. As a result, the electric motor of the present invention can maintain a semipermanent life span.

Figure 18:
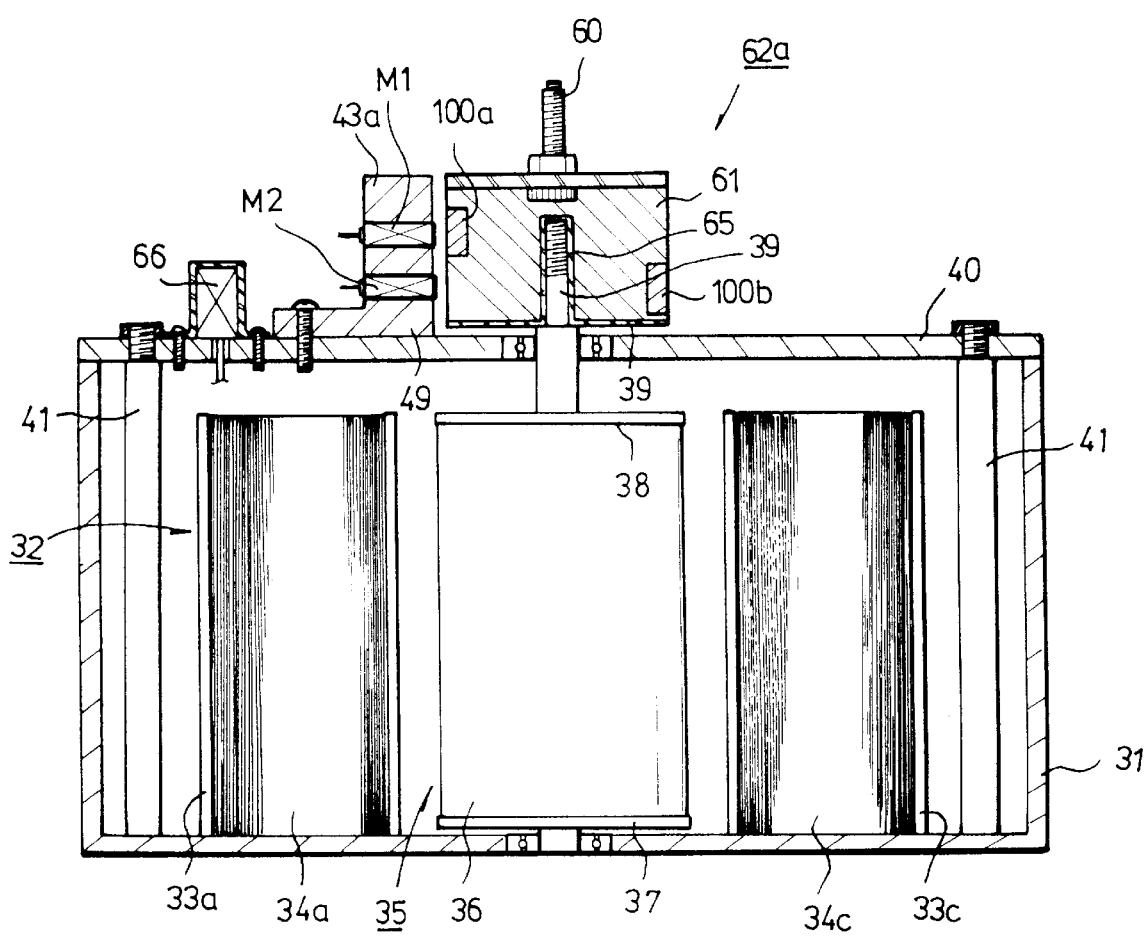
FIG. 18 is a sectional view illustrating a current converter in which a rotor has two polarities, according to other embodiment of the present invention.
Figure 19:
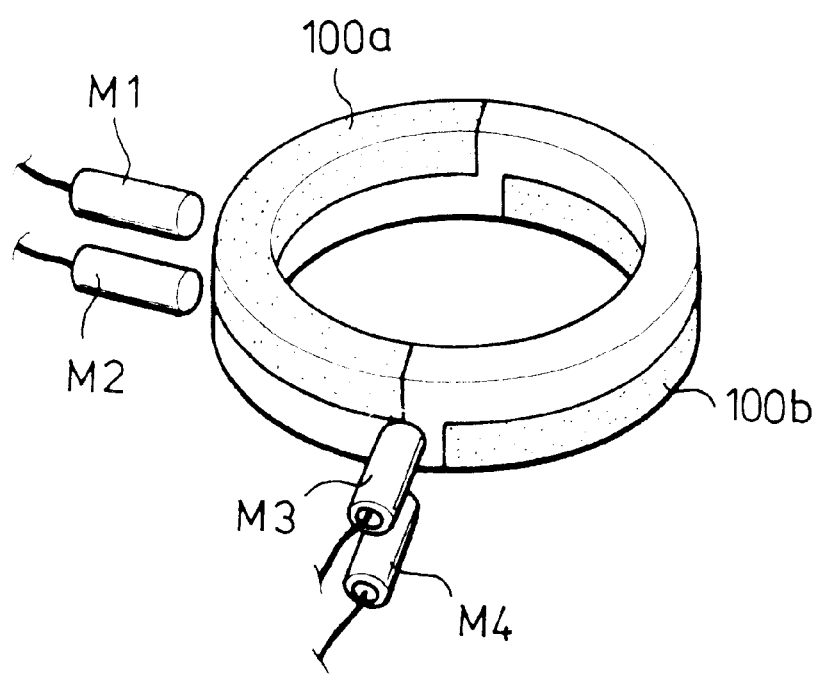
FIG. 19 is a perspective view illustrating main elements of a current converter in which a rotor has two polarities, according to other embodiment of the present invention.
Figure 20:
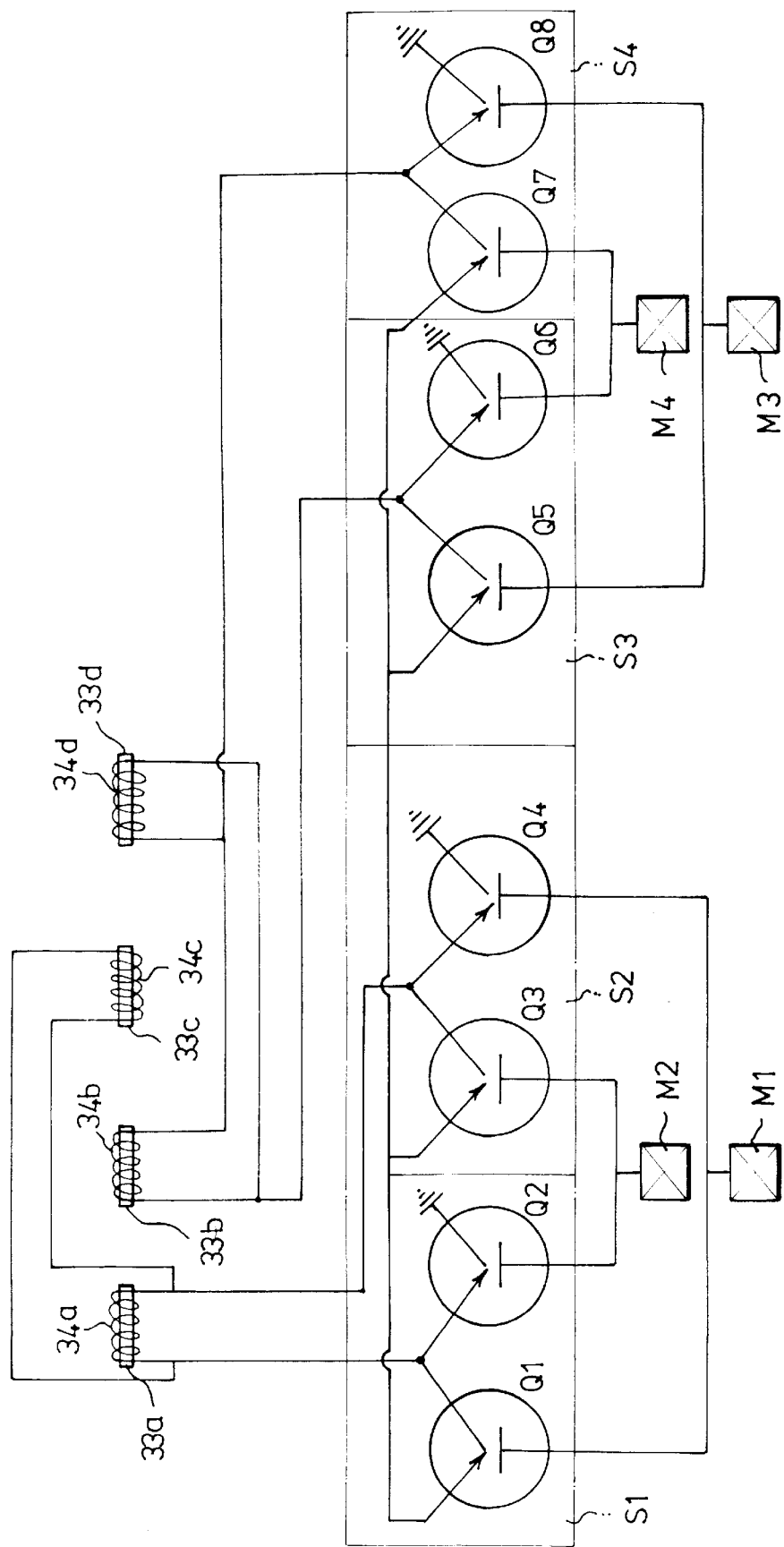
FIG. 20 is a view illustrating connection relationship between a coil and a current converter in which a rotor has two polarities, according to other embodiment of the present invention.
Figure 21:
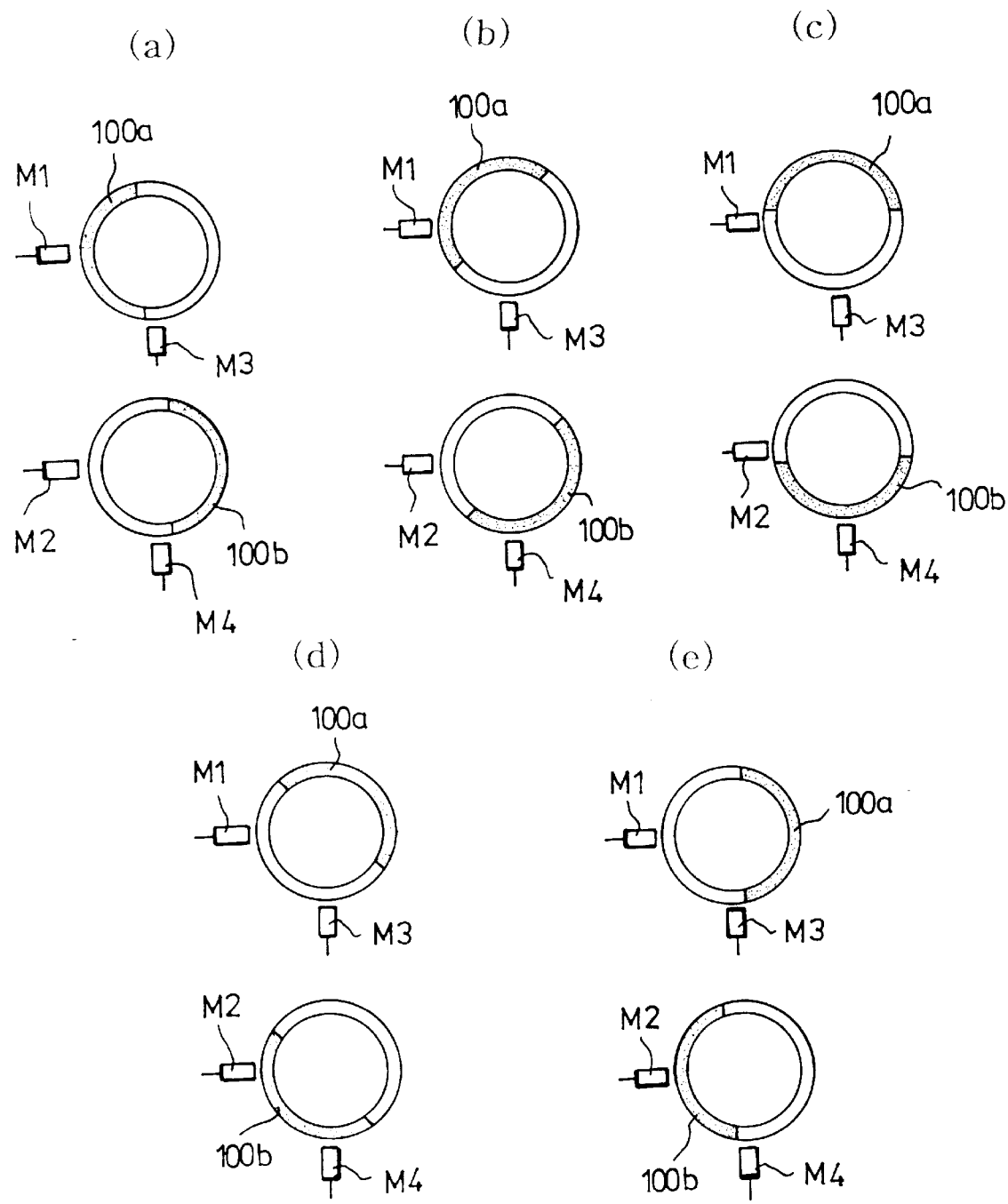
FIGS. 21(a)–(e) are plan views illustrating mutual operation states between a commutator and a magnetic sensor during rotation of a current converter in which a rotor has two polarities, according to other embodiment of the present invention.
Figure 22:
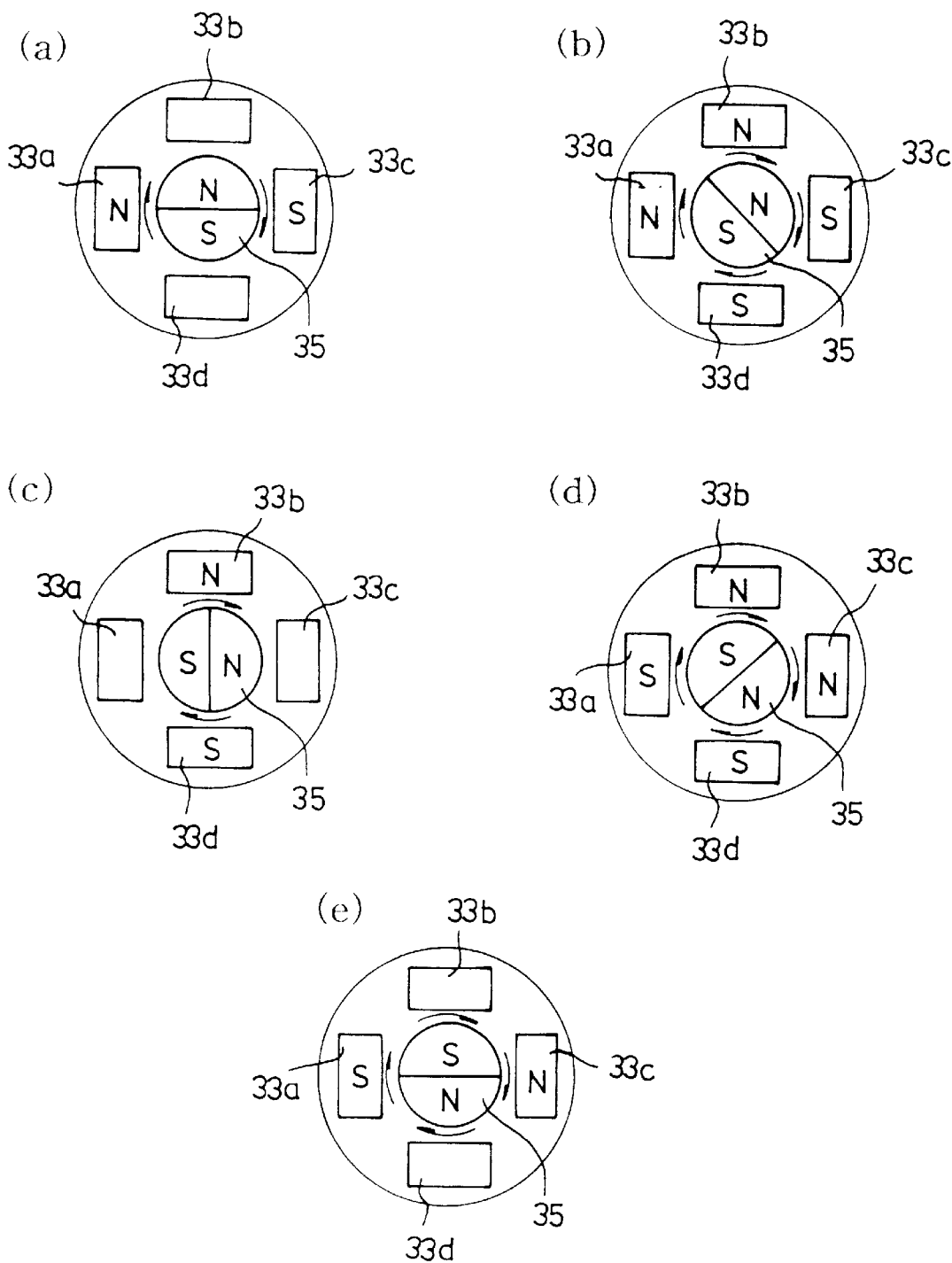
FIGS. 22(a)–(e) are views illustrating the operation steps of a rotor and a stator in a current converter in which a rotor has two polarities, according to other embodiment of the present invention.

FIG. 18 is a sectional view illustrating a current converter in which a rotor has two polarities, according to another embodiment of the present invention. FIG. 19 is a perspective view illustrating main elements of a current converter in which a rotor has two polarities, according to another embodiment of the present invention. FIG. 20 is a view illustrating a connection relationship between a coil and a current converter in which a rotor has two polarities, according to another embodiment of the present invention. FIG. 21 is a plan view illustrating a mutual operation state between a commutator and a magnetic sensor during rotation of a current converter in which a rotor has two polarities, according to another embodiment of the present invention. FIG. 22 is a view illustrating the operation steps of a rotor and a stator in a current converter in which a rotor has two polarities, according to another embodiment of the present invention, in this embodiment of the present invention, a current converter 62a which includes brushes and commutators has a compact structure. A stator and a rotor of the current converter 62a have the same configuration as those of the aforementioned converter 62.

In other words, permanent magnets 100a and 100b are mounted in a ring shape to oppose each other at 180° against the outside of a main body 61 of the current converter 62a which is combined with the connecting portion 39 over the rotor 35 mounted in the stator 32. First and second magnetic sensors M1 and M2 and third and fourth magnetic sensors M3 and M4 are respectively mounted in a magnetic sensor fixing portion 43a at 90° against each other in lower and upper directions of the permanent magnets 100a and 100b. The magnetic sensors M1, M2, M3 and M4 sense the permanent magnets 100a and 100b so as to convert polarity of the current supplied to the coils 34a~34d which are connected with the magnetic sensors M1, M2, M3 and M4.

As illustrated in FIG. 21a, if the permanent magnet 100a is sensed by the first magnetic sensor M1, the first coil 34a is conducted by the positive "+" polarity in response to a signal of the first magnetic sensor M1. While, since the permanent magnet 100a is not sensed by the second magnetic sensor M2, the second coil 34b is conducted by the negative "–" polarity. Thus, the power source is applied to the current supply portion 66.

Since the permanent magnet 100b is not sensed by the third and fourth magnetic sensors M3 and M4 disposed at 90° against the first and second magnetic sensors M1 and M2, the power source is not supplied to the current supply portion 66.

Therefore, as illustrated in FIG. 20, if the power source is applied to the first and second magnetic sensors M1 and M2, the first and fourth transistors Q1 and Q4 of the first and second switching portions S1 and S2 are turned on, while the second and third transistors Q2 and Q3 are turned off. As a result, the power source output from the current supply portion 66 is applied to the first coil 34a in forward direction through the collector of the first transistor Q1 and then flows to the ground through the fourth transistor Q4, so that the first iron core 33a wound by the first coil 34a has N polarity.

At the same time, the power source from the current supply portion 66 is applied to the third coil 34c in reverse direction through the collector of the first transistor Q1 and then flows to the ground through the fourth transistor Q4, so that the third iron core 33c has S polarity.

At this time, since the permanent magnet 100b is not sensed by the third and fourth magnetic sensors S3 and S4 which are disposed at 90° against the first and second magnetic sensors M1 and M2, the current does not flow to the second and fourth coils 34b and 34d, so that the second and fourth iron cores 33b and 33c do not have any polarity. As a result, the rotor 35 having two polarities of N and S is rotated by attraction and repulsion with the stator of only the first and third iron cores 33a and 33c.

In other words, as illustrated in FIG. 22a, attraction occurs between the first iron core 33a of N polarity and the rotor 35 of S polarity, while repulsion occurs between the first iron core 33a of N polarity and the rotor 35 of N polarity. At the same time, attraction occurs between the third iron core 33c of S polarity and the rotor 35 of N polarity, while repulsion occurs between the third iron core 33c of S polarity and the rotor 35 of S polarity. As a result, the rotor 35 rotates clockwise.

If the rotor 35 rotates clockwise, as illustrated in FIG. 18, the current converter 62a rotates clockwise because the connecting portion 39 of the rotor 35 and the combining portion 65 of the current converter 62a are screwed to each other. Thus, the position of the current converter 62a is varied.

Therefore, when the rotor 35 rotates at 45° clockwise, the current converter 62a rotates 45° clockwise. In this case, as illustrated in FIG. 21b, the permanent magnet 100a of the current converter 62a is sensed by the first magnetic sensor M1 and the other permanent magnet 100b is sensed by the third magnetic sensor M3, so that the first and third magnetic sensors M1 and M3 are conducted by the positive "+" polarity. On the other hand, since the fourth magnetic sensor fails to sense the permanent magnet, the fourth magnetic sensor is conducted by the negative "−" polarity. Thus, the power source is applied to the current supply portion 66. As a result, the first, fourth, fifth and eighth transistors Q1, Q4, Q5 and Q8 are to be turned on. On the other hand, the second, third, sixth and seventh transistors Q2, Q3, Q6 and Q7 are to be turned off.

Thus, the power source output from the current supply portion 66 is applied to the first and second coils 34a and 34b in forward direction, while the power source output from the current supply portion 66 is applied to the third and fourth coils 34c and 34d in reverse direction. As a result, the first and second iron cores 33a and 33b have N polarity, while the third and fourth iron cores 33c and 33d have S polarity. Attraction and repulsion occur between the first to fourth iron cores 33a~33d and the rotor 35 so as to strongly rotate the rotor 35 clockwise.

As aforementioned, the polarities of the current supplied to the first to fourth coils 34a~34d through the current supply portion 66 from the current converter 62a are converted as the rotor 35 rotates at 45° clockwise. Thus, the rotor 35 rotates with a strong rotative force due to attraction and repulsion between the stator 32 and the rotor 35. The converting operation of the polarities of the current between the rotor 35 and the stator 32 will be omitted as it has been described above.

Figure 23:
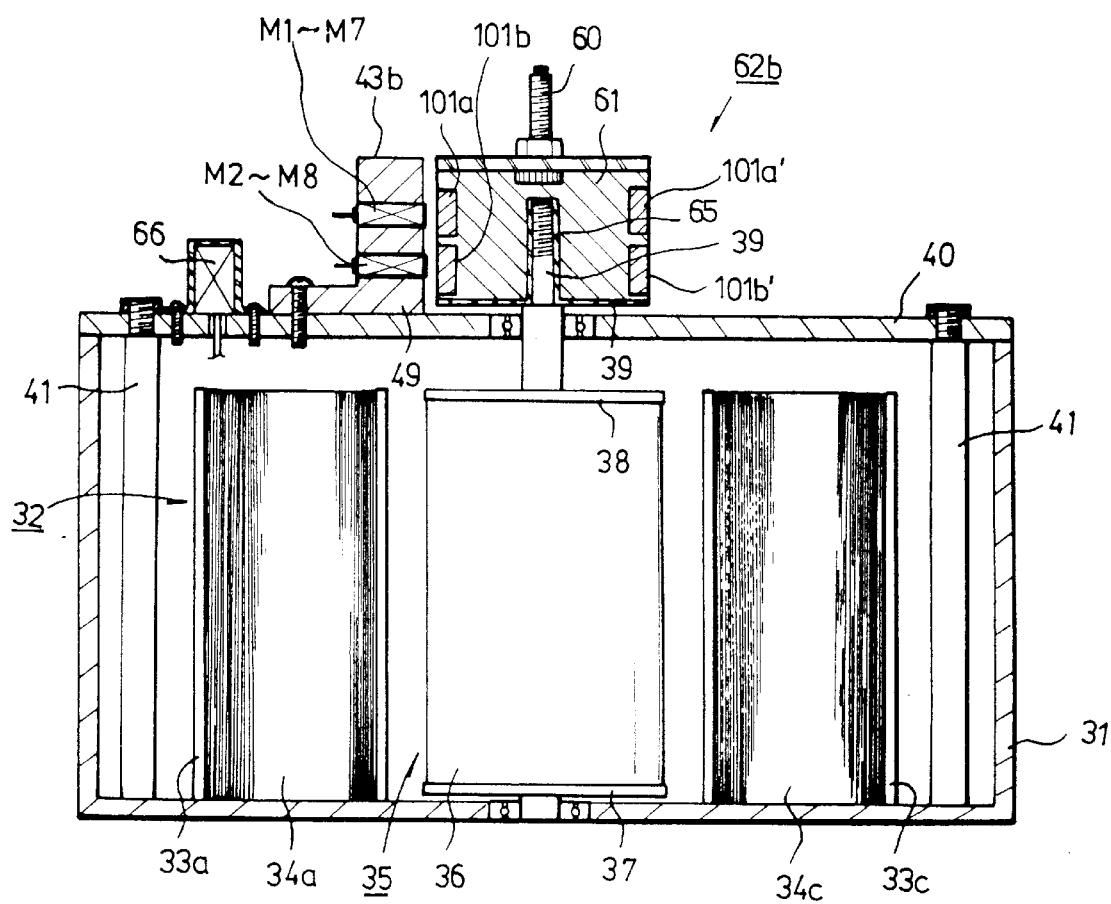
FIG. 23 is a sectional view illustrating a current converter in which a rotor has four polarities, according to other embodiment of the present invention.
Figure 24:
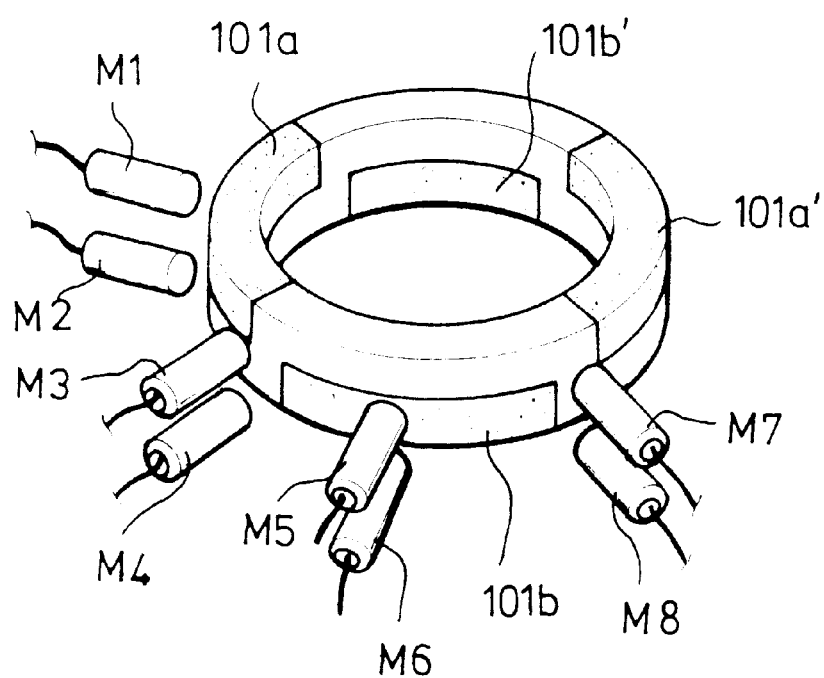
FIG. 24 is a perspective view illustrating main elements of a current converter in which a rotor has four polarities, according to other embodiment of the present invention.
Figure 25:
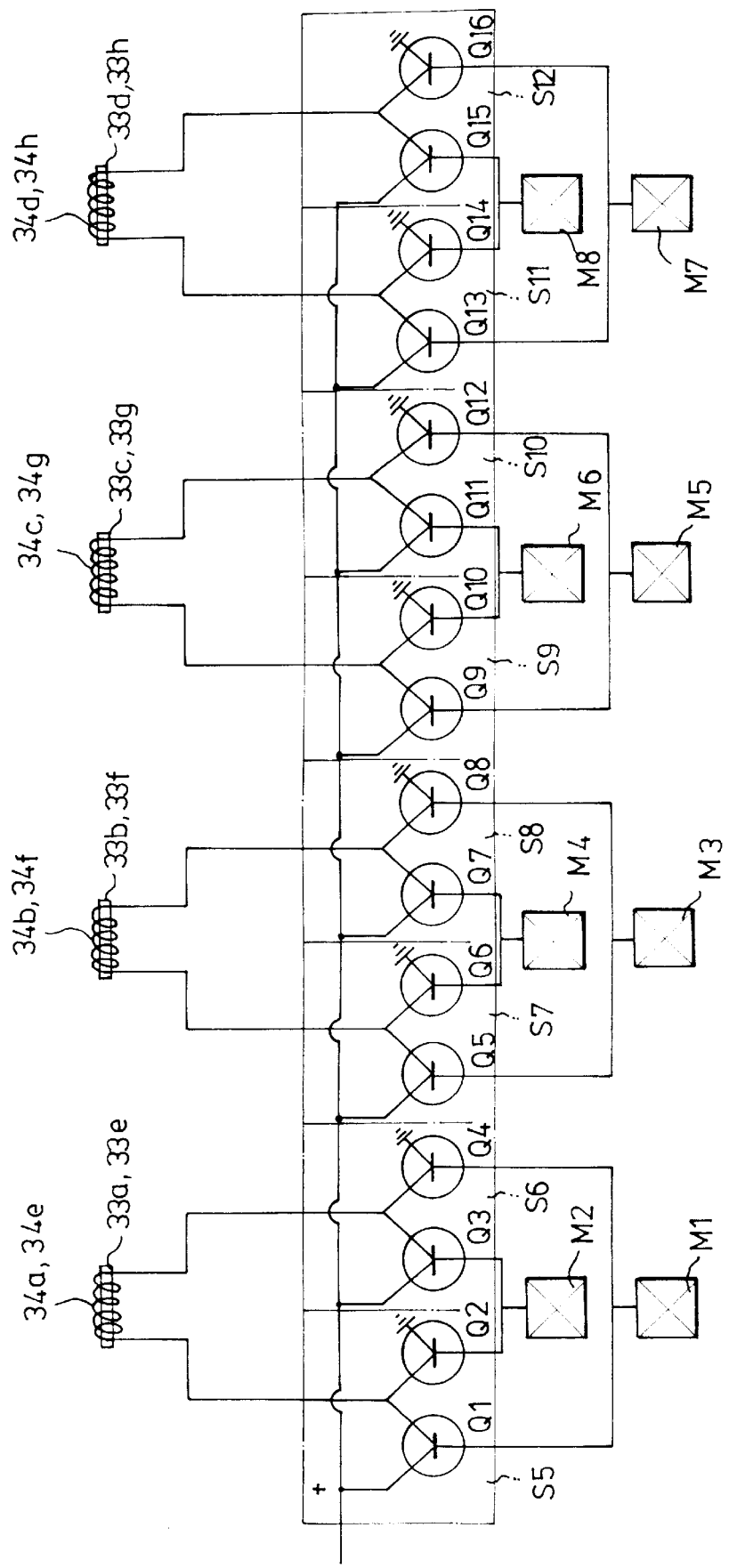
FIG. 25 is a view illustrating connection relationship between a coil and a current converter in which a rotor has four polarities, according to other embodiment of the present invention.
Figure 26:
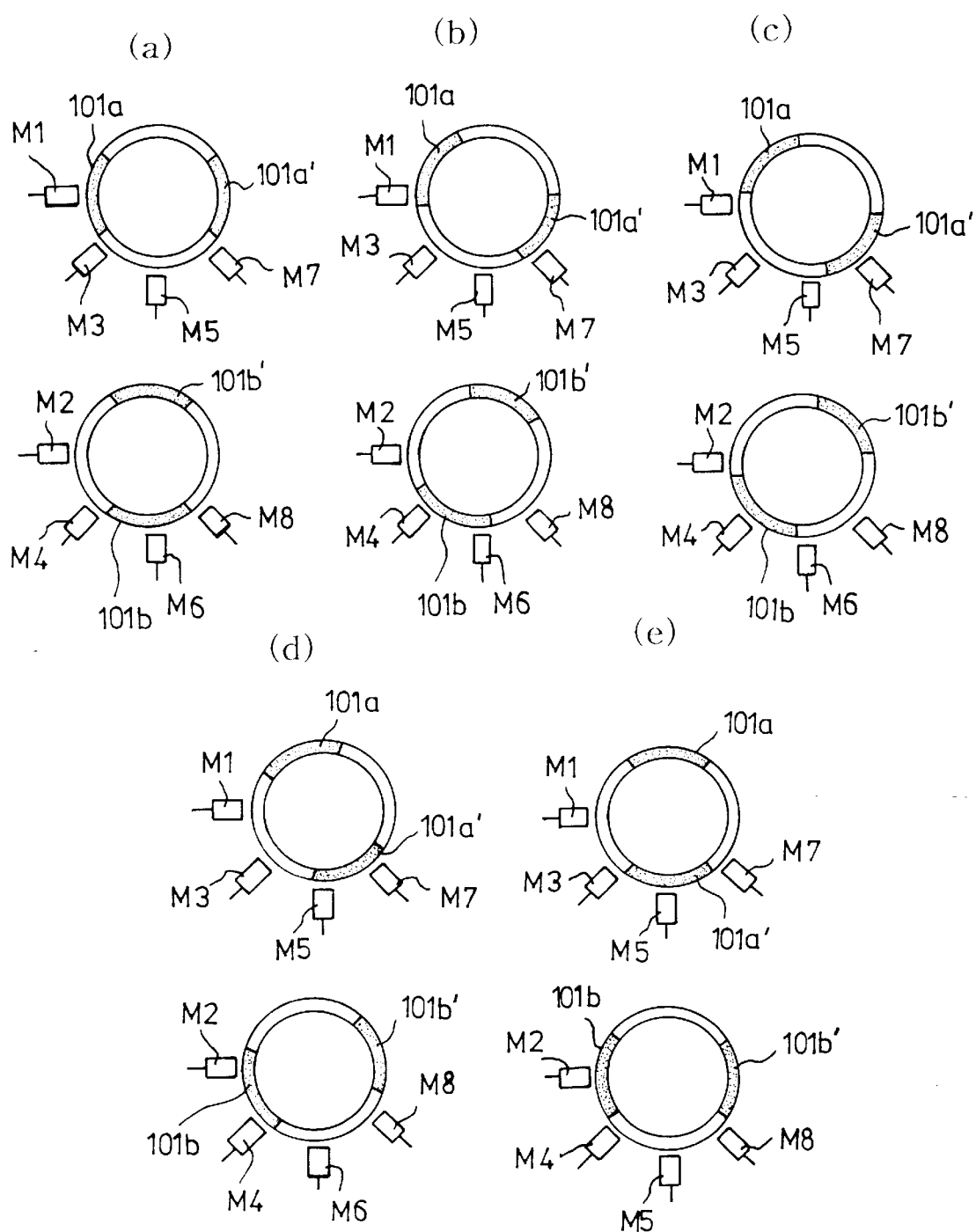
FIGS. 26(a)–(e) are plan views illustrating mutual operation states between a commutator and a magnetic sensor during rotation of a current converter in which a rotor has four polarities, according to other embodiment of the present invention.
Figure 27:
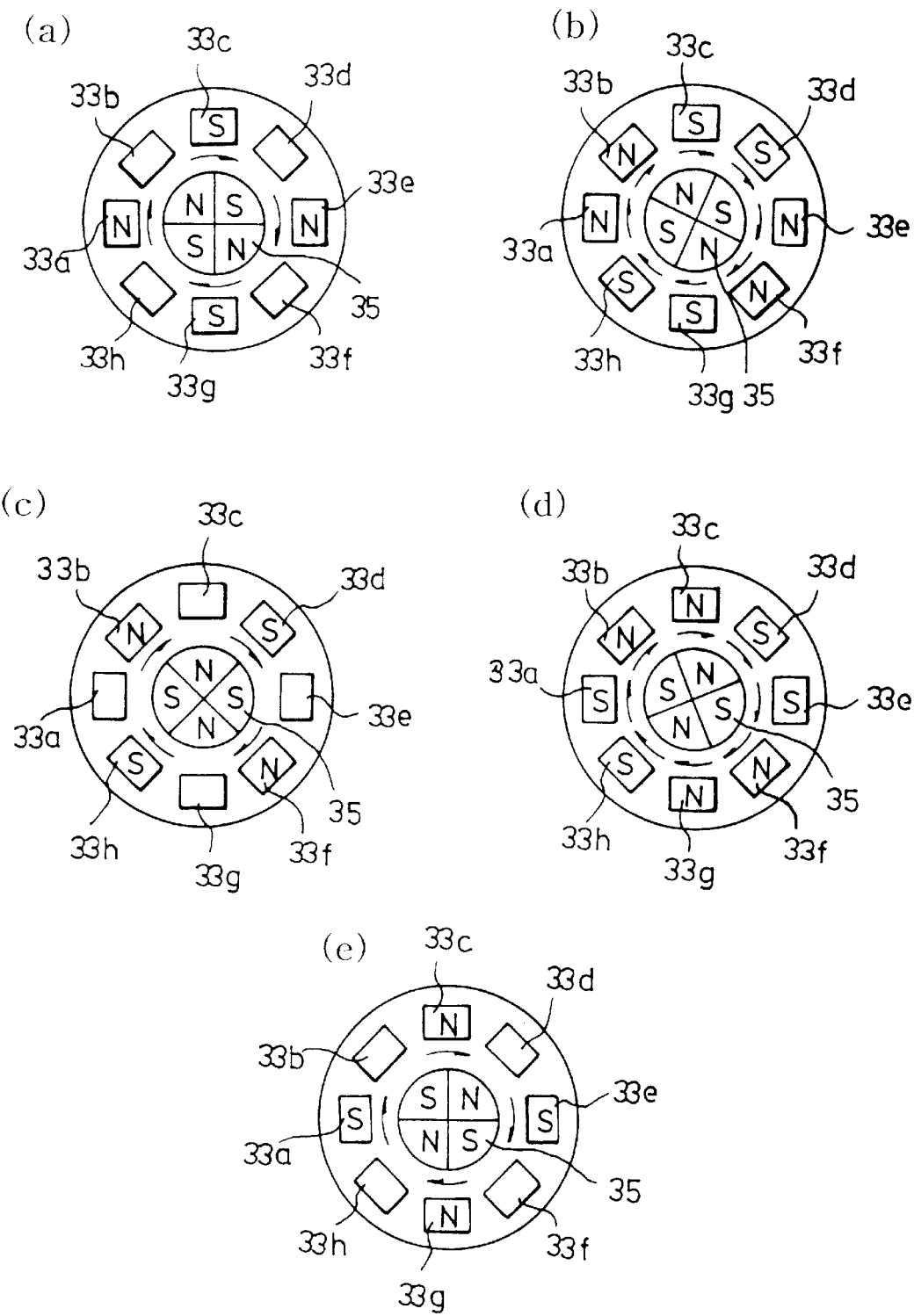
FIGS. 27(a)–(e) are views illustrating the operation steps of a rotor and a stator in a current converter in which a rotor has four polarities, according to other embodiment of the present invention.

FIG. 23 is a sectional view illustrating a current converter in which a rotor has four polarities, according to another embodiment of the present invention. FIG. 24 is a perspective view illustrating main elements of a current converter in which a rotor has four polarities, according to another embodiment of the present invention. FIG. 25 is a view illustrating a connection relationship between a coil and a current converter in which a rotor has four polarities, according to another embodiment of the present invention. FIG. 26 is a plan view illustrating a mutual operation state between a commutator and a magnetic sensor during rotation of a current converter in which a rotor has four polarities, according to another embodiment of the present invention. FIG. 27 is a view illustrating the operation steps of a rotor and a stator in a current converter in which a rotor has four polarities, according to another embodiment of the present invention.

Permanent magnets 101a, 101a', 101b and 101b' are mounted in a ring shape to oppose one another at 90° against the outside of a main body 61 of a current converter 62b which is combined with the connecting portion 39 over the rotor 35 mounted in the stator 32. First to eighth magnetic sensors M1~M8 are mounted in a magnetic sensor fixing portion 43b in lower and upper directions of the permanent magnets 101a, 101a', 101b and 101b'. The magnetic sensors M1~M8 sense the permanent magnets 101a, 101a', 101b and 101b' so as to convert polarity of the current supplied to the coils 34a~34h of the stator 32.

As illustrated in FIG. 26a, if the permanent magnets 101a and 101a' are sensed by the first magnetic sensor M1, the first and fifth coils 34a and 34e which are connected with the first magnetic sensor M1 are conducted by the positive "+" polarity in response to a signal of the first magnetic sensor M1. However, since the permanent magnets 101a, 101a', 101b and 101b' are not sensed by the second magnetic sensor M2, the coils which are connected with the second magnetic sensor M2 are conducted by the negative "−" polarity. Thus, the power source is applied to the current supply portion 66.

Since the permanent magnets 101a, 101a', 101b and 101b' are not sensed by the third and fourth magnetic sensors M3 and M4 disposed at 45° against the first and second magnetic sensors M1 and M2, the power source is not applied to the current supply portion 66.

Meanwhile, since the permanent magnets 101b and 101b' are not sensed by the fifth magnetic sensor M5, the coils 34c and 34g which are connected with the fifth magnetic sensor M5 are conducted by the negative "−" polarity in response to a signal of the fifth magnetic sensor M5. Since the permanent magnets 101b and 101b' are sensed by the sixth magnetic sensors M6, the coils 34c and 34g are conducted by the positive "+" polarity and then the power source is applied to the current supply portion 66. Since the permanent magnets 101a, 101a', 101b and 101b' are not sensed by the seventh and eighth magnetic sensors M7 and M8 disposed at 45° against the fifth and sixth magnetic sensors M5 and M6, the power source is not applied to the current supply portion 66.

Therefore, as illustrated in FIG. 25, if the power source is applied to the first, second, fifth and sixth magnetic sensors M1, M2, M5 and M6, the eleventh, fourteenth, twentieth and twenty-first transistors of the fifth, sixth, ninth and tenth switching portions S5, S6, S9 and S10 are turned on, while the twelveth, thirteenth, nineteenth and twenty-second transistors Q12, Q13, Q19 and Q22 are turned off. As a result, the power source output from the current supply portion 66 is applied to the first and fifth coils 34a and 34e in forward direction through the collector of the eleventh transistor Q11 and then flows to the ground through the fourteenth transistor Q14, so that the first and fifth iron core 33a and 33e wound by the first and fifth coils 34a and 34e have N polarity. At the same time, the power source from the current supply portion 66 is applied to the third and seventh coils 34c and 34g in reverse direction through the collector of the twenty-first transistor Q21 and then flows to the ground through the twentieth transistor Q20, so that the third and seventh iron cores 33c and 33g wound by the third and seventh coils 34c and 34g have S polarity.

At this time, the power source is not applied to the third and fourth magnetic sensors M3 and M4 and the seventh and eighth magnetic sensors M7 and M8. For this reason, the current does not flow to the second and fourth coils 34b and 34d and the sixth and eighth coils 34f and 34h, so that the second, fourth, sixth and eighth iron cores 33b, 33d, 33f and 33h do not have any polarity. As a result, as illustrated in FIG. 26a, the rotor 35 having four polarities is rotated clockwise by attraction and repulsion with the stator of the first, third, fifth and seventh iron cores 33a, 33c, 33e and 33g.

Therefore, if the rotor 35 rotates clockwise, the current converter 62b rotates clockwise because the connecting portion 39 of the rotor 35 and the combining portion 65 of the current converter 62b are screwed to each other. Thus, the position of the current converter 62b is varied.

When the rotor 35 rotates at 22.5° clockwise, the current converter 62b rotates 22.5° clockwise, too. In this case, as illustrated in FIG. 26b, since the permanent magnets 101a, 101a' of the current converter 62b are sensed by the first to fourth magnetic sensors M1~M4 and the other permanent magnets 101b, 101b' are sensed by the fifth to eighth magnetic sensors M5~M8, the eleventh, fourteenth, fifteenth, eighteenth, twentieth, twenty-first, twenty-fourth and twenty-fifth transistors Q12, Q14, Q15, Q18, Q20, Q21, Q24 and Q25 are to be turned on. On the other hand, the tweleveth, thirteenth, sixteenth, seventeenth, nineteenth, twenty-second, twenty- third and twenty-sixth transistors Q12, Q13, Q16, Q17, Q19, Q22, Q23 and Q26 are to be turned off.

Thus, the power source output from the current supply portion 66 is applied to the first, fifth, second and sixth coils 34a, 34e, 34b and 34f in forward direction through the collectors of the eleventh and fifteenth transistors Q11 and Q15 and then flows to the ground through the twentieth transistor Q20. While, the power source output from the current supply portion 66 is applied to the third, seventh, fourth and eighth coils 34c, 34g, 34d and 34h in reverse direction through the collectors of the twenty-first and twenty-fifth transistors Q21 and Q25 and then flows to the ground through the twenty-fourth transistor Q24.

Thus, the first, fifth, second and sixth iron cores 33a, 33e, 33b and 33f wound by the first, fifth, second and sixth coils 34a, 34e, 34b and 34f have N polarity, while the third, seventh, fourth and eighth iron cores 33c, 33g, 33d and 33h wound by the third, seventh, fourth and eighth coils 34c, 34g, 34d and 34h have S polarity.

As a result, as illustrated in FIG. 27b, strong attraction and repulsion occurs between the first to eighth iron cores 33a~33h and the rotor 35 having four polarities so as to strongly rotate the rotor 35 clockwise.

As aforementioned, the polarities of the current supplied to the first to eighth coils 34a~34h through the current supply portion 66 from the current converter 62b are converted as the rotor 35 rotates at 22.50 clockwise. Thus, the rotor 35 rotates at strong rotative force due to attraction and repulsion between the stator 32 and the rotor 35. The converting operation of the polarities of the current between the rotor 35 and the stator 32 will be omitted as it has been described above.

Figure 28A:
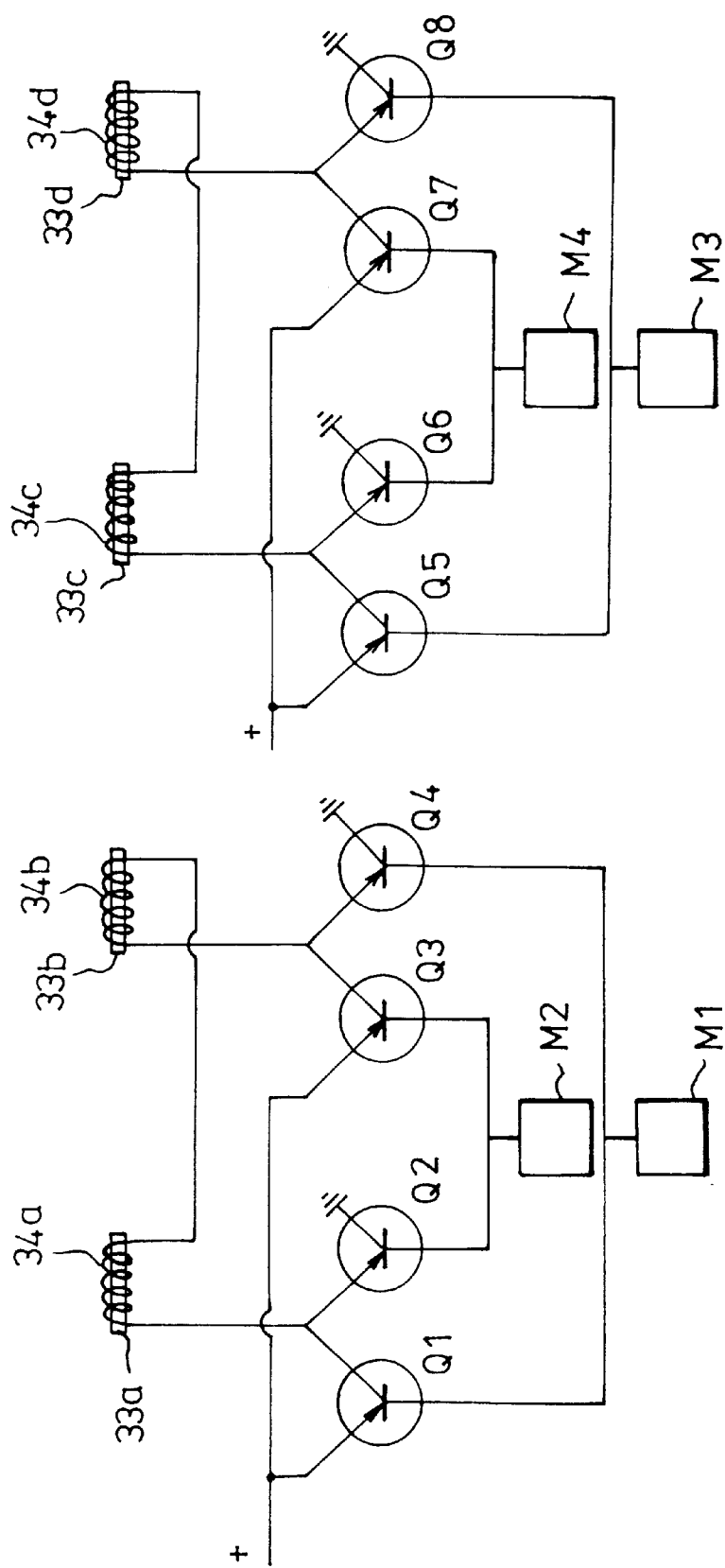
FIGS. 28a and 28b are views illustrating series connection between a magnetic sensor and a coil in a current converter in which a rotor has two polarities and four polarities, according to other embodiment of the present invention.
Figure 28B:
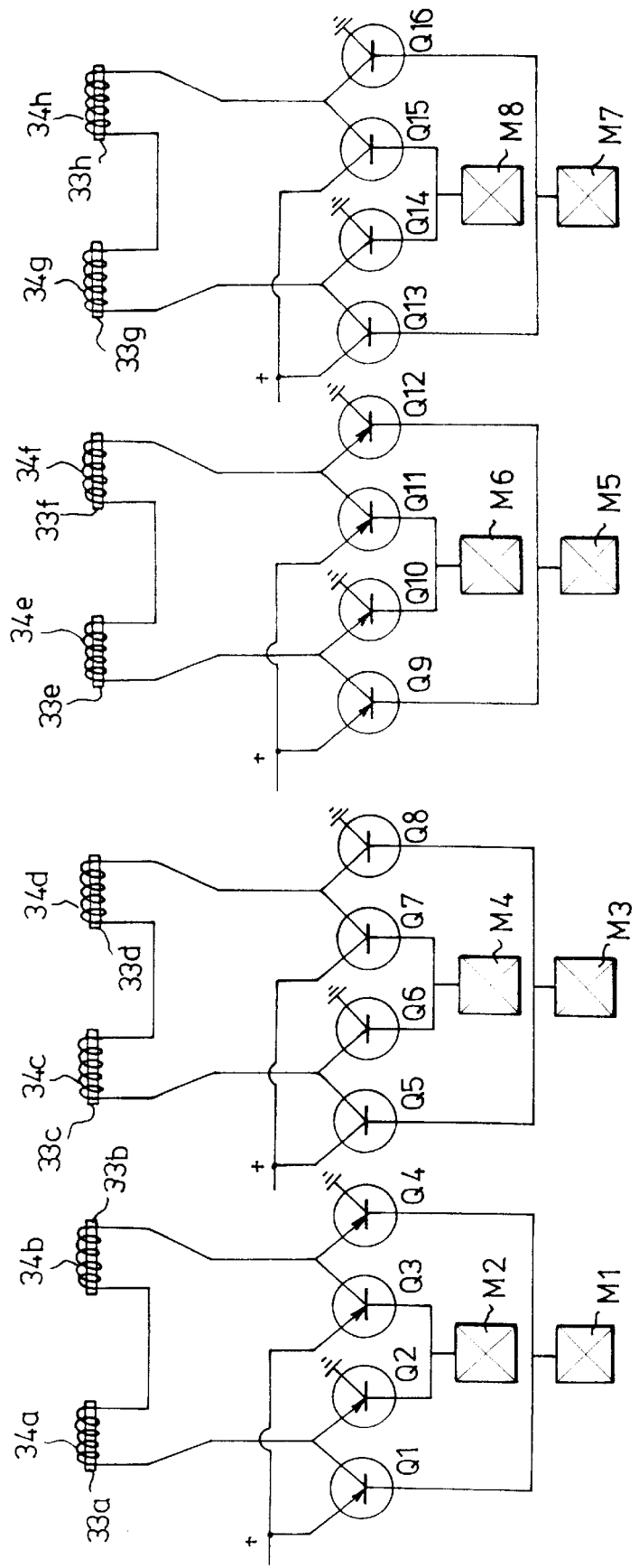

FIGS. 28a and 28b are views illustrating a series connection between magnetic sensors and coils in current converters 62a and 62b in which a rotor has two polarities and four polarities, according to another embodiment of the present invention. In this embodiment, the current converters 62a and 62b which include the magnetic sensors M1~M4 and M1~M8, respectively, are connected with the coils 34a~34d and 34a~34h wound in the iron cores 33a~33d and 33a~33h in series.

Such a series connection circuit is more general than a parallel connection circuit. The present invention can apply to both a series connection circuit and a parallel connection circuit. Detailed description thereof will be omitted.

Figure 29:
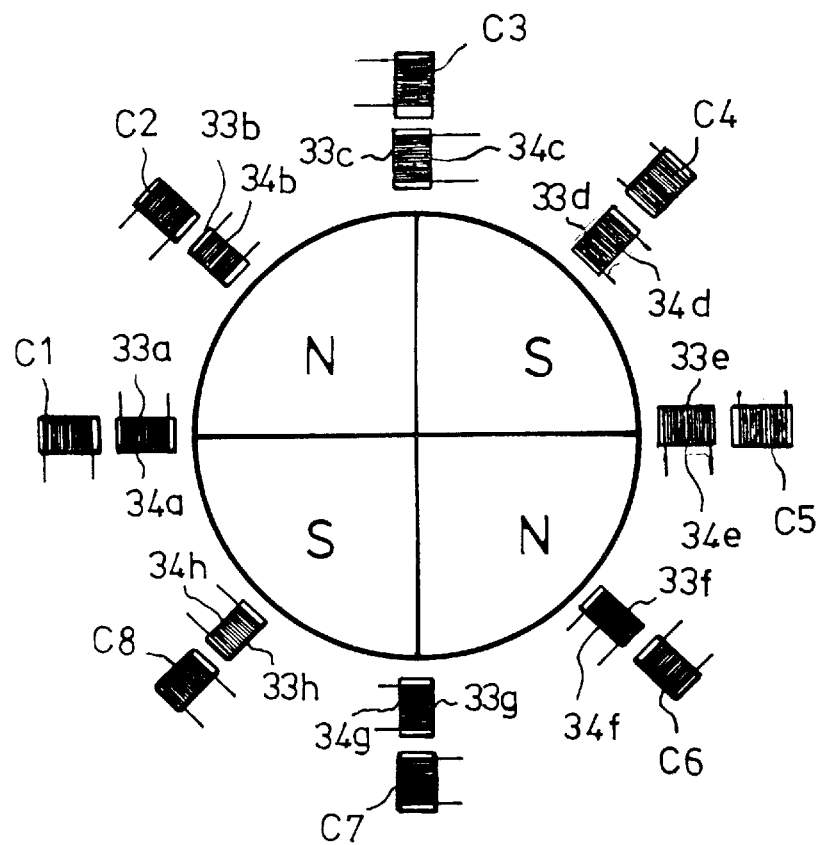
FIG. 29 is a plan view illustrating a modification example of an electric motor according to the present invention.
Figure 30:
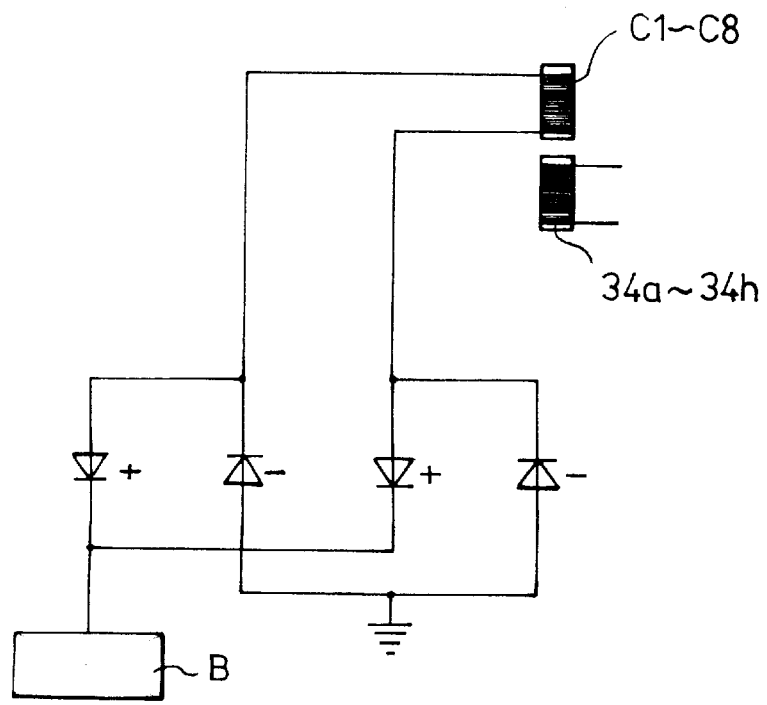
FIG. 30 is a circuit diagram of FIG. 29.

FIG. 29 is a plan view illustrating a modification example of an electric motor according to the present invention. FIG. 30 is a circuit diagram of FIG. 29.

Referring to FIG. 29, induction coils C1~C8 are mounted towards the outside of the coils 34a~34h wound in the iron cores 33a~33h to absorb electric energy of the current of which polarities are converted as the coils 34a~34h of the stator 32 are conducted, so that the electric energy can be recycled.

In other words, if the coils 34a~34h wound in the iron cores 33a~33h are conducted, the polarities of the current are converted. The remaining current of the current which rotates the rotor 35, that is, extra electric energy is absorbed by the induction coils using induction principles of electron and then stored by a storage battery B so as to be recycled. The induction coils C1~C8 are mounted in one direction of the coils 34a~34h wound in the iron coils 33a~33h to absorb the remaining current of the current by means of induction electromotive force, which rotates the rotor 35 by converting the polarities of the iron cores 33a~33h by means of the current which flows to the coils 34a~34h in forward and reverse directions. The absorbed current is stored in the storage battery B to be recycled. The current applied to the induction coils C1~C8 is applied to the coils 34a~34h when the polarities of the coils 34a~34h are converted to enhance the intensity of the current depending on conversion of the polarities of the coils 34a~34h. As a result, since the current flows to the coils 34a~34h one time, the one sides of the coils 34a~34h generate rotative force while the other sides thereof generate current.

As aforementioned, the electric motor according to the present invention has the following advantages.

The rotor is made of a permanent magnet having two or more polarities and the stator is made of an electromagnet of which the polarity is converted when the current is applied to the coils wound in the iron cores. Attraction and repulsion occur between the electromagnet of the stator and the permanent magnet of the rotor. The polarities of the iron cores and the number of the polarities thereof are converted depending on the position of the rotor by converting the polarity of the current applied to the coils, by means of the current converter and the current supply portion. As a result, attraction and repulsion between the rotor and the stator are enhanced, thereby achieving the maximum rotative force by means of minimum power consumption.

Meanwhile, the rotor is rotated by converting polarity of the remaining current, that is, extra electric energy applied to the coils wound in the iron cores. When the current does not occur, the induction current occurs by induction action of the induction coils, so as to save energy and minimize consumption of energy required to drive the electric motor. As a result, the electric motor of the present invention can be widely used in various industrial fields such as an electric car.

It will be apparent to those skilled in the art that various modifications and variations can be made in the electric motor of the present invention without departing from the spirit or scope of the invention. Thus, it is intended that the present invention cover the modifications and variations of the invention provided they come within the scope of the appended claims and their equivalents.

What is claimed is:

1. An electric motor comprising:
   a stator, said stator including a main body having a plurality of separate iron cores mounted stationary therein at a predetermined distance from each other, and a plurality of separate coils wound in the plurality of iron cores;
   a rotor disposed in a center portion of the main body, said rotor including a permanent magnet having a predetermined number of polarities between an upper cover and a lower cover, said upper cover including a connecting portion formed integral therewith;
   a current converter screwed to the connecting portion of the rotor which is externally protruded over a cover of the main body, said current converter for supplying current to the plurality of coils wound in the plurality of iron cores and converting the polarity of the current;
   a brush fixing portion for supplying main current to the current converter and for fixing a plurality of brushes which supply current to the coils through the current converter; and a current supply portion mounted in the cover of the main body and connected to the plurality of brushes, said current supply portion for supplying current to the plurality of coils wound in the plurality of iron cores.

2. The electric motor as claimed in claim 1, wherein the rotor has two polarities, the brush fixing portion is mounted around the current converter for connecting first to sixth terminals, first to sixth springs, and said plurality of brushes including first to sixth brushes with one another by a cable, and the first to fourth brushes are disposed at 90° with respect to the fifth and sixth brushes.

3. The electric motor as claimed in claim 2, wherein induction coils are provided at one side of each of the plurality of iron cores wound by the plurality of coils to induce and absorb extra current of the coils for storing in a storage battery.

4. The electric motor as claimed in claim 1, wherein the rotor has two polarities, and the current converter includes:
- a first commutator in contact with a first brush of said plurality of brushes, to which a positive "+" power source is applied;
- a second commutator disposed at a predetermined distance from the first commutator and in contact with a second brush of said plurality of brushes, to which a negative "–" power source is applied;
- a third commutator disposed at a predetermined distance from the second commutator in contact with third and fifth brushes of said plurality of brushes and connected to the first commutator by a first cable, for applying the current to the plurality of coils;
- a fourth commutator disposed to oppose the third commutator in contact with the third and fifth brushes and connected to the second commutator by a second cable, for applying the current to the plurality of coils;
- a fifth commutator disposed below the third commutator at a predetermined distance in contact with fourth and sixth brushes of said plurality of brushes and connected to the second commutator by the second cable, for applying the current to the plurality of coils;
- a sixth commutator disposed to oppose the fifth commutator in contact with the fourth and sixth brushes and connected to the first commutator by the first cable, for applying the current to the plurality of coils;
- a main body made of an insulator which insulates the first to sixth commutators from one another; and
- a combining portion screwed to the connecting portion of the rotor.

5. The electric motor as claimed in claim 4, wherein induction coils are provided at one side of each of the plurality of iron cores wound by the plurality of coils to induce and absorb extra current of the coils for storing in a storage battery.

6. The electric motor as claimed in claim 1, wherein the rotor has two polarities, and the current supply portion includes:
- a first switching portion having first and second transistors, the first and second transistors having emitter terminals connected with each other and base terminals connected with a third brush of said plurality of brushes, a collector terminal of the first transistor is connected to a power source portion, and a collector terminal of the second transistor is grounded; and
- second to fourth switching portions connected to fourth to sixth brushes of said plurality of brushes, respectively, having third to eighth transistors having the same configuration as that of the first switching portion, wherein first ends of first and third coils of said plurality of coils are connected to the emitter terminals of the first and second transistors of the first switching portion, second ends of the first and third coils are connected to emitters of the third and fourth transistors of the second switching portion, first ends of second and fourth coils of said plurality of coils are connected to emitter terminals of the fifth and sixth transistors of the third switching portion, and second ends of the second and fourth coils are connected to emitters of the seventh and eighth transistors of the fourth switching portion.

7. The electric motor as claimed in claim 6, wherein induction coils are provided at one side of each of the plurality of iron cores wound by the plurality of coils to induce and absorb extra current of the coils for storing in a storage battery.

8. The electric motor as claimed in claim 1, wherein the rotor has four polarities, the brush fixing portion is mounted around the current converter for connecting first to tenth terminals, first to tenth springs, and said plurality of brushes including first to tenth brushes with one another by a cable, and the first to fourth brushes are disposed at 90° against the fifth and sixth brushes, and the seventh and eighth bushes are disposed at 45° against the ninth and tenth brushes.

9. The electric motor as claimed in claim 8, wherein induction coils are provided at one side of each of the plurality of iron cores wound by the plurality of coils to induce and absorb extra current of the coils for storing in a storage battery.

10. The electric motor as claimed in claim 1, wherein the rotor has four polarities, and the current converter includes:
- a first commutator in contact with a first brush of the plurality of brushes, to which a positive "+" power source is applied;
- a second commutator disposed at a predetermined distance from the first commutator and in contact with a second brush of the plurality of brushes, to which a negative "–" power source is applied;
- seventh to tenth commutators disposed below the second commutator at a predetermined distance in contact with third, fifth, seventh and ninth brushes of the plurality of brushes which apply driving signals to the current supply portion;
- eleventh to fourteenth commutators disposed below the seventh to tenth commutators at a predetermined distance in contact with fourth, sixth, eighth and tenth brushes of the plurality of brushes which apply driving signals to the current supply portion;
- a main body made of an insulator which insulates the first and second commutators from the seventh to fourteenth commutators; and
- a combining portion screwed to the connecting portion of the rotor, wherein the sixth and seventh commutators and the thirteenth and fourteenth commutators are connected to the first commutator by a third cable, and the ninth and tenth commutators and the eleventh and twelfth commutators are connected to the second commutator by a fourth cable.

11. The electric motor as claimed in claim 10, wherein induction coils are provided at one side of each of the plurality of iron cores wound by the plurality of coils to induce and absorb extra current of the coils for storing in a storage battery.

12. The electric motor as claimed in claim 1, wherein the rotor has four polarities, and the current supply portion includes:

a fifth switching portion having eleventh and twelfth transistors, the eleventh and twelfth transistors having emitter terminals connected with each other and base terminals connected with a third brush of said plurality of brushes, a collector terminal of the eleventh transistor is connected to a power source portion, and a collector terminal of the twelfth transistor is grounded; and sixth to twelfth switching portions connected to first to tenth brushes of said plurality of brushes, respectively, having thirteenth to twenty-sixth transistors having the same configuration as those of the fifth switching portion, wherein first ends of first and fifth coils of said plurality of coils are connected to the emitter terminals of the eleventh and twelfth transistors of the fifth switching portion, second ends of the first and fifth coils are connected to emitters of the thirteenth and fourteenth transistors of the sixth switching portion, first ends of second and sixth coils of said plurality of coils are connected to emitter terminals of the fifteenth and sixteenth transistors of the seventh switching portion, second ends of the second and sixth coils are connected to emitters of the seventeenth and eighteenth transistors of the eighth switching portion, first ends of third and seventh coils of said plurality of coils are connected to emitter terminals of the nineteenth and twentieth transistors of the ninth switching portion, second ends of the third and seventh coils are connected to emitters of the twenty-first and twenty-second transistors of the tenth switching portion, and first ends of fourth and eighth coils of said plurality of coils are connected to emitter terminals of the twenty-third and twenty-fourth transistors of the eleventh switching portion, second ends of the fourth and eighth coils are connected to emitters of the twenty-fifth and twenty-sixth transistors of the twelfth switching portion.

13. The electric motor as claimed in claim 12, wherein induction coils are provided at one side of each of the plurality of iron cores wound by the plurality of coils to induce and absorb extra current of the coils for storing in a storage battery.

14. The electric motor as claimed in claim 1, wherein the rotor has two polarities, and the current converter includes:

permanent magnets mounted in a ring shape on a main body connected to the rotor to oppose each other at 180° in lower and upper directions; and first to fourth magnetic sensors disposed in a magnetic sensor fixing portion at 90° against one another, for sensing the permanent magnets, wherein the first to fourth magnetic sensors are connected to the plurality of coils wound in the plurality of iron cores of the stator by a cable and sense the permanent magnets so as to convert polarities of the plurality of coils.

15. The electric motor as claimed in claim 14, wherein induction coils are provided at one side of each of the plurality of iron cores wound by the plurality of coils to induce and absorb extra current of the coils for storing in a storage battery.

16. The electric motor as claimed in claim 1, wherein the rotor has four polarities, and the current converter includes:

permanent magnets mounted in a ring shape on a main body connected to the rotor to oppose one another at 90° in lower and upper directions; and first and eighth magnetic sensors disposed in a magnetic sensor fixing portion at 45° against one another, for sensing the permanent magnets, wherein the first to eighth magnetic sensors are connected to the plurality of coils wound in the plurality of iron cores of the stator by a cable and sense the permanent magnets so as to convert polarities of the plurality of coils.

17. The electric motor as claimed in claim 16, wherein induction coils are provided at one side of each of the plurality of iron cores wound by the plurality of coils to induce and absorb extra current of the coils for storing in a storage battery.

18. The electric motor as claimed in claim 1, wherein induction coils are provided at one side of each of the plurality of iron cores wound by the plurality of coils to induce and absorb extra current of the coils for storing in a storage battery.

* * * * *